US009472055B2

(12) United States Patent
Arnone et al.

(10) Patent No.: US 9,472,055 B2
(45) **Date of Patent: *Oct. 18, 2016**

(54) INITIATION MODES FOR A CREDIT AND ENABLING SYSTEM FOR VIRTUAL CONSTRUCTS

(71) Applicant: Gamblit Gaming, LLC, Glendale, CA (US)

(72) Inventors: Miles Arnone, Sherborn, MA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,078

(22) Filed: Jun. 15, 2015

(65) Prior Publication Data

US 2015/0294536 A1 Oct. 15, 2015

Related U.S. Application Data

(63) Continuation of application No. 14/174,813, filed on Feb. 6, 2014, now Pat. No. 9,058,723, which is a continuation of application No. PCT/US2013/020588, filed on Jan. 7, 2013.

(60) Provisional application No. 61/631,525, filed on Jan. 5, 2012.

(51) Int. Cl.
*A63F 13/00* (2014.01)
*G07F 17/32* (2006.01)

(52) U.S. Cl.
CPC ....... *G07F 17/3262* (2013.01); *G07F 17/3204* (2013.01); *G07F 17/3244* (2013.01); *G07F 17/3267* (2013.01)

(58) Field of Classification Search
CPC .................. A63F 2300/00; A63F 2300/5513; A63F 2300/558; A63F 2300/61; A63F 2300/64; G07F 17/23; G07F 17/2302; G07F 17/3223; G07F 17/3225; G07F 17/3258; G07F 17/3262; G07F 17/3267; G07F 17/3295
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 2001300098 A 10/2001
JP 2003111980 A 4/2003
(Continued)

OTHER PUBLICATIONS

U.S. Appl. No. 13/600,671, Arnone, et al., filed Aug. 31, 2012.
(Continued)

*Primary Examiner* — Tramar Harper
*Assistant Examiner* — Jeffrey Wong
(74) *Attorney, Agent, or Firm* — Frank Cire

(57) ABSTRACT

Systems in accordance with embodiments of the invention operate a controlled entity hybrid game including an entertainment software controller connected by a network to a game world controller, and constructed to: execute an entertainment game; convey actions taken by the player, wherein the actions include the player's instruction of a controlled entity, wherein upon consumption of the enabling element, a wager is triggered in the gambling game; and the game world controller connected to a real world controller and connected by the network to the entertainment software controller, wherein the game world controller is constructed to: receive the actions taken by the player; trigger the wager of the amount of real world credits in the gambling game; accumulate an amount of the enabling element in a reserve enabling element reservoir; and allow access in the entertainment game to the amount of enabling element on passing one or more transport tests.

16 Claims, 17 Drawing Sheets

(56) References Cited

U.S. PATENT DOCUMENTS 5,785,592 A 7/1998 Jacobsen
5,853,324 A 12/1998 Kami et al.
5,963,745 A 10/1999 Collins et al.
6,050,895 A 4/2000 Luciano
6,165,071 A 12/2000 Weiss
6,227,974 B1 5/2001 Eilat
6,267,669 B1 7/2001 Luciano
6,685,563 B1 2/2004 Meekins et al.
6,712,693 B1 3/2004 Hettinger
6,761,632 B2 7/2004 Bansemer et al.
6,761,633 B2 7/2004 Riendeau
6,764,397 B1 7/2004 Robb
6,811,482 B2 11/2004 Letovsky
7,118,105 B2 10/2006 Benevento
7,294,058 B1 11/2007 Slomiany
7,326,115 B2 2/2008 Baerlocher
7,361,091 B2 4/2008 Letovsky
7,517,282 B1 4/2009 Pryor
7,575,517 B2 8/2009 Parham et al.
7,682,239 B2 3/2010 Friedman et al.
7,720,733 B2 5/2010 Jung
7,753,770 B2 7/2010 Walker et al.
7,753,790 B2 7/2010 Nguyen
7,766,742 B2 8/2010 Bennett et al.
7,775,885 B2 8/2010 Van Luchene
7,798,896 B2 9/2010 Katz
7,828,657 B2 11/2010 Booth
7,917,371 B2 3/2011 Jung et al.
7,938,727 B1 5/2011 Konkle
7,967,674 B2 6/2011 Baerlocher
7,980,948 B2 7/2011 Rowe
7,996,264 B2 8/2011 Kusumoto et al.
8,012,023 B2 9/2011 Gates
8,047,908 B2 11/2011 Walker
8,047,915 B2 11/2011 Lyle
8,060,829 B2 11/2011 Jung et al.
8,075,383 B2 12/2011 Friedman et al.
8,087,999 B2 1/2012 Oberberger
8,113,938 B2 2/2012 Friedman et al.
8,118,654 B1 2/2012 Nicolas
8,128,487 B2 3/2012 Hamilton et al.
8,135,648 B2 3/2012 Oram
8,137,193 B1 3/2012 Kelly et al.
8,142,272 B2 3/2012 Walker
8,157,653 B2 4/2012 Buhr
8,167,699 B2 5/2012 Inamura
8,177,628 B2 5/2012 Manning
8,182,338 B2 5/2012 Thomas
8,182,339 B2 5/2012 Anderson
8,187,068 B2 5/2012 Slomiany
8,206,210 B2 6/2012 Walker
8,475,266 B2 7/2013 Arnone
8,480,470 B2 7/2013 Napolitano et al.
8,622,809 B1 1/2014 Arora et al.
2001/0004609 A1 6/2001 Walker et al.
2001/0019965 A1 9/2001 Ochi
2002/0022509 A1 2/2002 Nicastro
2002/0090990 A1 7/2002 Joshi et al.
2002/0175471 A1 11/2002 Faith
2003/0060286 A1 3/2003 Walker et al.
2003/0119576 A1 6/2003 McClintic et al.
2003/0139214 A1 7/2003 Wolf et al.
2003/0171149 A1 9/2003 Rothschild
2003/0204565 A1 10/2003 Guo et al.
2003/0211879 A1 11/2003 Englman
2004/0092313 A1 5/2004 Saito et al.
2004/0102238 A1 5/2004 Taylor
2004/0121839 A1 6/2004 Webb
2004/0225387 A1 11/2004 Smith
2005/0003878 A1 1/2005 Updike
2005/0096124 A1 5/2005 Stronach
2005/0116411 A1 6/2005 Herrmann et al.
2005/0192087 A1 9/2005 Friedman et al.
2005/0233791 A1 10/2005 Kane
2005/0233806 A1 10/2005 Kane et al.
2005/0239538 A1 10/2005 Dixon
2005/0269778 A1 12/2005 Samberg
2005/0288101 A1 12/2005 Lockton et al.
2006/0003823 A1 1/2006 Zhang
2006/0003830 A1 1/2006 Walker et al.
2006/0035696 A1 2/2006 Walker
2006/0040735 A1 2/2006 Baerlocher
2006/0068913 A1 3/2006 Walker et al.
2006/0084499 A1 4/2006 Moshal
2006/0084505 A1 4/2006 Yoseloff
2006/0135250 A1 6/2006 Rossides
2006/0154710 A1 7/2006 Serafat
2006/0166729 A1 7/2006 Saffari et al.
2006/0189371 A1 8/2006 Walker et al.
2006/0223611 A1 10/2006 Baerlocher
2006/0234791 A1 10/2006 Nguyen et al.
2006/0240890 A1 10/2006 Walker
2006/0246403 A1 11/2006 Monpouet et al.
2006/0258433 A1 11/2006 Finocchio et al.
2007/0026924 A1 2/2007 Taylor
2007/0035548 A1 2/2007 Jung et al.
2007/0038559 A1 2/2007 Jung et al.
2007/0064074 A1 3/2007 Silverbrook et al.
2007/0087799 A1 4/2007 Van Luchene
2007/0093299 A1 4/2007 Bergeron
2007/0099696 A1 5/2007 Nguyen et al.
2007/0117641 A1 5/2007 Walker et al.
2007/0129149 A1 6/2007 Walker
2007/0142108 A1 6/2007 Linard
2007/0156509 A1 7/2007 Jung et al.
2007/0167212 A1 7/2007 Nguyen
2007/0167239 A1 7/2007 O'Rourke
2007/0173311 A1 7/2007 Morrow et al.
2007/0191104 A1 8/2007 Van Luchene
2007/0202941 A1 8/2007 Miltenberger
2007/0203828 A1 8/2007 Jung et al.
2007/0207847 A1 9/2007 Thomas
2007/0259717 A1 11/2007 Mattice
2007/0293306 A1 12/2007 Nee et al.
2008/0004107 A1 1/2008 Nguyen et al.
2008/0014835 A1 1/2008 Weston et al.
2008/0015004 A1 1/2008 Gatto et al.
2008/0064488 A1 3/2008 Oh
2008/0070659 A1 3/2008 Naicker
2008/0070690 A1 3/2008 Van Luchene
2008/0070702 A1 3/2008 Kaminkow
2008/0096665 A1 4/2008 Cohen
2008/0108406 A1 5/2008 Oberberger
2008/0108425 A1 5/2008 Oberberger
2008/0113704 A1 5/2008 Jackson
2008/0119283 A1 5/2008 Baerlocher
2008/0146308 A1 6/2008 Okada
2008/0161081 A1 7/2008 Berman
2008/0176619 A1 7/2008 Kelly
2008/0191418 A1 8/2008 Lutnick et al.
2008/0195481 A1 8/2008 Lutnick
2008/0248850 A1 10/2008 Schugar
2008/0254893 A1 10/2008 Patel
2008/0274796 A1 11/2008 Lube
2008/0274798 A1 11/2008 Walker et al.
2008/0311980 A1 12/2008 Cannon
2008/0318668 A1 12/2008 Ching
2009/0011827 A1 1/2009 Englman
2009/0023489 A1 1/2009 Toneguzzo
2009/0023492 A1 1/2009 Erfanian
2009/0061974 A1 3/2009 Lutnick et al.
2009/0061975 A1 3/2009 Ditchev
2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells

(56) References Cited

U.S. PATENT DOCUMENTS

| | | | |
|---|---|---|---|
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1 | 12/2012 | Arnone et al. |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Basallo et al. |
| 2014/0087801 | A1 | 3/2014 | Nicely et al. |
| 2014/0087808 | A1 | 3/2014 | Basallo et al. |
| 2014/0087809 | A1 | 3/2014 | Leupp et al. |

FOREIGN PATENT DOCUMENTS

| | | | |
|---|---|---|---|
| JP | 2004097610 | A | 4/2004 |
| JP | 20040097610 | A1 | 4/2004 |
| JP | 2004166746 | A | 6/2004 |
| WO | 9851384 | A1 | 11/1998 |
| WO | 2010087090 | A1 | 8/2010 |
| WO | 2011109454 | A1 | 9/2011 |
| WO | 2012139083 | A1 | 10/2012 |
| WO | 2013059308 | A1 | 4/2013 |
| WO | 2013103940 | A1 | 7/2013 |
| WO | 2013103995 | A2 | 7/2013 |

OTHER PUBLICATIONS

U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.

(56) References Cited

OTHER PUBLICATIONS

U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
WIPO—ISA, International Search Report and Written Opinion, PCT/US13/020588, May 13, 2013.
WIPO—IPEA, International Preliminary Report on Patentability, PCT/US13/020588, Dec. 19, 2013.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

INITIATION MODES FOR A CREDIT AND ENABLING SYSTEM FOR VIRTUAL CONSTRUCTS

CROSS REFERENCE TO RELATED APPLICATIONS

This application is a continuation U.S. patent application Ser. No. 14/174,813, filed Feb. 6, 2014, which is a continuation of Patent Cooperation Treaty Application No. PCT/US13/20588, filed on Jan. 7, 2013, which claims the benefit of U.S. Provisional Patent Application No. 61/631,525 filed on Jan. 5, 2012, the contents of each of which are hereby incorporated by reference in their entirety as if stated in full herein.

FIELD OF THE INVENTION

Embodiments of the present invention are generally related to gaming and more specifically to various control elements within a hybrid game that includes both an entertainment game and a gambling game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY

Systems in accordance with embodiments of the invention operate a controlled entity hybrid game. In one embodiment, an entertainment software controller connected by a network to a game world controller, wherein the entertainment software controller is constructed to: execute an entertainment game providing outcomes based upon a player's skillful execution of the entertainment game; and convey, to the game world controller by the network, actions taken by the player during the player's skillful execution of the entertainment game, wherein the actions taken by the player include the player's instruction of a controlled entity of the entertainment game whereby the controlled entity consumes a discrete amount of an enabling element of the entertainment game, wherein the enabling element is an element of the entertainment game utilized by the controlled entity in a game world environment, and wherein upon consumption of the enabling element, a wager of real world credits is triggered in the gambling game by the game world controller; and the game world controller connected to a real world controller and connected by the network to the entertainment software controller, wherein the game world controller is constructed to: receive from the entertainment software controller the actions taken by the player; trigger the wager of the amount of real world credits in the gambling game based upon the actions taken by the player, wherein the amount of real world credits is based on the discrete amount of the enabling element consumed by the controlled entity; accumulate an amount of the enabling element in a reserve enabling element reservoir as a result of a gambling game outcome; and allow access in the entertainment game to the amount of enabling element in the reserve enabling element reservoir on passing one or more transport tests on a basis of a value of an entertainment game variable of the entertainment game.

In a further embodiment, consumption of the enabling element by the controlled entity causes an actionable element of the entertainment game to trigger the wager of the amount of real world credits in the gambling game.

In a further embodiment, the entertainment game variable is a change in a game world credit caused by entertainment game play.

In a further embodiment, the entertainment game variable is an entertainment game object required for consumption of the enabling element.

In a further embodiment, the entertainment game variable is an entertainment game environmental condition required for consumption of the enabling element.

In a further embodiment, the real world controller is connected by a network to the game world controller.

In a further embodiment, the game world controller and the entertainment software controller are constructed from the same device.

In a further embodiment, the real world controller and the game world controller are constructed from the same device.

An embodiment includes a real world controller connected to a game world controller, wherein the real world controller is constructed to: provide a gambling game outcome as a randomly generated payout of real world credits from a wager of an amount of real world credits in a gambling game; and receive a trigger from the game world controller to execute the wager of an amount of real world credits in the gambling game; and the game world controller connected to the real world controller and connected by a network to an entertainment software controller, wherein the game world controller is constructed to: receive from the entertainment software controller the actions taken by the player during the player's skillful execution of an entertainment game executed by the entertainment software controller, wherein the actions taken by the player include the player's instruction of a controlled entity of the entertainment game whereby the controlled entity consumes a discrete amount of an enabling element of the entertainment game, and wherein the enabling element is an element of the entertainment game utilized by the controlled entity in a game world environment; trigger the wager of the amount of real world credits in the gambling game based upon the actions taken by the player, wherein the amount of real world credits is based on the discrete amount of the enabling element consumed by the controlled entity; accumulate an amount of the enabling element in a reserve enabling element reservoir as a result of the gambling game outcome; and allow access in the entertainment game to the amount of enabling element in the reserve enabling element reservoir on passing one or more transport tests on a basis of a value of an entertainment game variable of the entertainment game.

DETAILED DESCRIPTION

Figure 1:
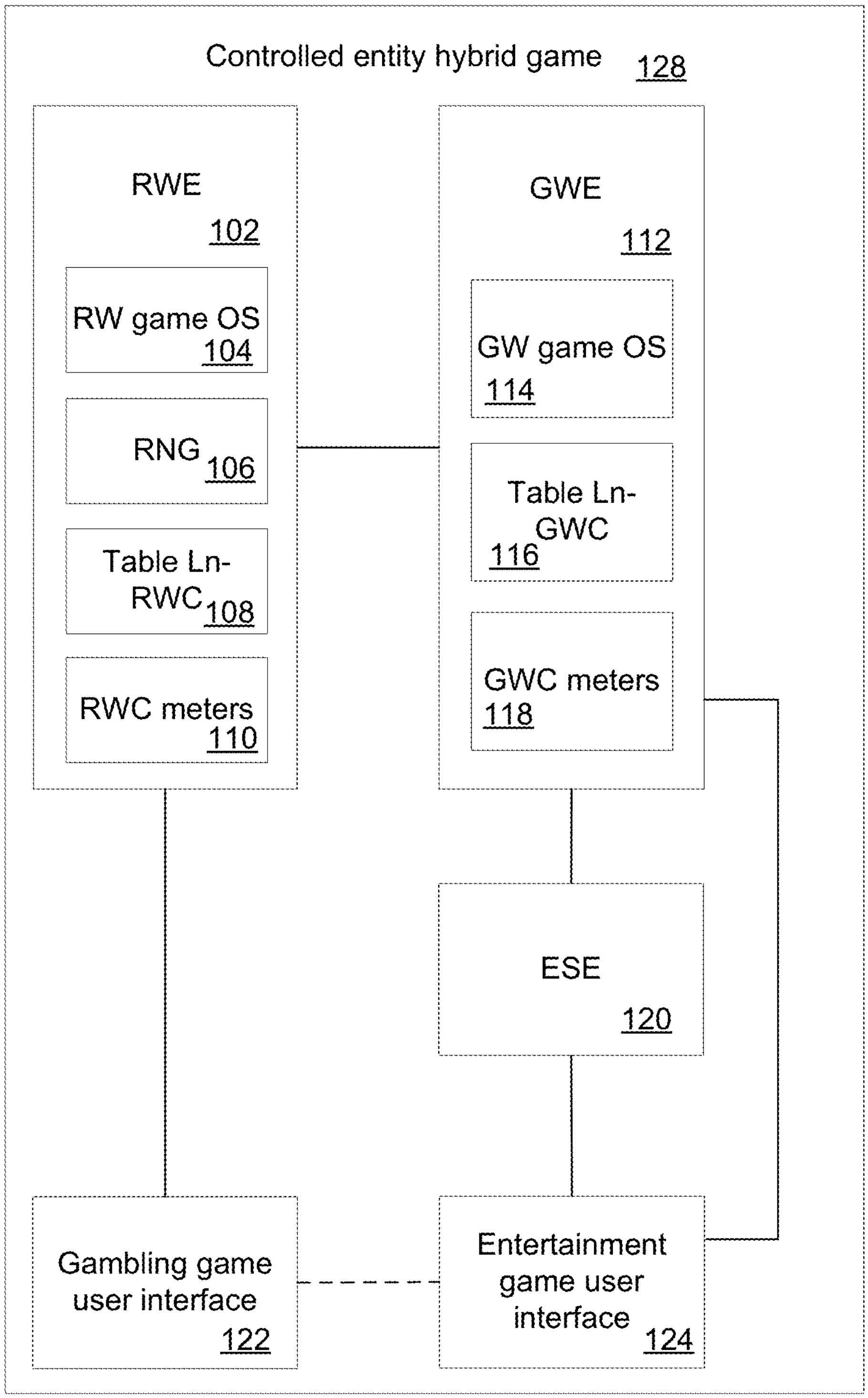
FIG. 1 illustrates a controlled entity hybrid game in accordance with an embodiment of the invention.

Turning now to the drawings, systems and methods for operation of a controlled entity hybrid game are illustrated. In several embodiments, a controlled entity hybrid game is a form of a hybrid game that incorporates a controlled entity within an entertainment game portion of a hybrid game. The controlled entity is acted upon by a player and acts upon various classes of elements within the entertainment portion of a hybrid game. When acted upon, these various elements trigger bets or wagers in a gambling game portion of the hybrid game. In certain embodiments, the controlled entity hybrid game also includes a user interface associated with either or both the gambling game and the entertainment game. In operation of a controlled entity hybrid game, a player acts upon a controlled entity which in turn utilizes various types of elements of the entertainment game in a game world environment. Upon utilization of some of these elements, a wager is triggered in the gambling game. In playing the entertainment game, using the controlled entity, a player can consume and accrue game world credits (GWC) within the entertainment game. These credits can be in the form of (but are not limited to) game world objects, experience points, or points generally. Wagers are made in the gambling game using real world credits (RWC). The real world credits can be credits in an actual currency, or may be credits in a virtual currency which has real world value. Gambling outcomes from the gambling game may cause consumption, loss or accrual of RWC. In addition, gambling outcomes in the gambling game may influence elements in the entertainment game such as (but not limited to) by adding an element, restoring a consumed element, causing the loss of an element, restoration of an element, or placement of an element. Example elements include (but are not limited to) enabling elements (EE) which are elements that enable a player's play of the entertainment game and whose consumption by the controlled entity while playing the entertainment game may trigger a wager in the gambling game. In addition, EE may also be replenished during play within the entertainment game based on an outcome of a triggered wager. Other types of elements include actionable elements (AE), which are elements that are acted upon to trigger a wager in the gambling game and may not be restorable during normal play of the entertainment game, and collective enabling elements (CEE). Various hybrid games are discussed in Patent Cooperation Treaty Application No. PCT/US11/26768, filed Mar. 1, 2011, entitled "ENRICHED GAME PLAY ENVIRONMENT (SINGLE and/or MULTIPLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, a controlled entity hybrid game is a hybrid game incorporating controlled entities that are controlled by a player and act upon various types of elements in a hybrid game. A controlled entity hybrid game can be used to generate a rich gameplay experience. As is discussed further below, any of a variety of different controlled entity hybrid game scenarios can be utilized including (but not limited to) war themed controlled entity hybrid games, sports themed controlled entity hybrid games, and racing themed controlled entity hybrid games.

Controlled Entity Hybrid Games

In many embodiments, a controlled entity hybrid game integrates high levels of entertainment content with a game of skill (entertainment game), a gambling experience with a game of chance (gambling game). A controlled entity hybrid game provides for random outcomes independent of player skill while providing that the user's gaming experience (as measured by obstacles/challenges encountered, time of play and other factors) is shaped by the player's skill. A controlled entity hybrid game in accordance with an embodiment of the invention is illustrated in FIG. 1. The controlled entity hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the skill calibrated hybrid game 128 and controls and operates the gambling game. The operation of a gambling game is enabled by RWC, such as money, real world funds, or a virtual currency. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level "n" real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level "n" real-world credit pay table (Table Ln-RWC) 108 is a table that can be used in conjunction with a random number generator (RNG) 106 to dictate the real world credits (RWC) earned as a function of sponsored gameplay and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game "level n" need not be the same for each level.

In many embodiments, the GWE 112 manages the overall controlled entity hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120. The GWE can also utilize a multilayer module to apply a gameplay impact generated from a player action in one gameplay layer to players at different gameplay layers. In numerous embodiments, a GWE can utilize a multilayer module to detect at least one player action, analyze the at least one player action for a gameplay impact and apply the gameplay impact to the gameplay of players at different gameplay layers in the controlled entity hybrid game in accordance with the gameplay impact. The players at different gameplay layers can be part of a player class at the different gameplay layers.

In many embodiments, a level "n" game world credit pay table (Table Ln-GWC) 116 dictates the GWC earned as a function of player skill in the nth level of the game. The payouts governed by this table are dependent upon player skill and sponsored gameplay at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each entertainment game has one or more scoring criterion, embedded within the Table Ln-GWC 116 that reflects player performance against the goal(s) of the game. GWC can be carried forward from one level of sponsored gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of a controlled entity hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

In many embodiments, the ESE 120 operates mostly independently from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's processes may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of entertainment games at different gameplay layers interconnected during a gameplay session with gameplay impact from player actions at one gameplay layer applied to gameplay at another gameplay layer including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in the entertainment game such as those cited above.

In many embodiments, a controlled entity hybrid game integrates a video game style gambling machine, where the gambling game (i.e. RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate "garners" can be established with the entertainment game. In several embodiments, the controlled entity hybrid game can leverage very popular titles with "garners" and provides a sea change environment for casinos to attract players with games that are more akin to the type of entertainment that a younger generation desires. In various embodiments, players can use their skill towards building and banking GWC that in turn can be used to win tournaments and various prizes as a function of their "gamer" prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, controlled entity hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The controlled entity hybrid game can include an entertainment game that includes head-to-head play between a single player and the computer, between two or more players against one another, or multiple players playing against the computer and/or each other, as well as the process by which players bet on the outcome of the entertainment game.

Network Connected Controlled Entity Hybrid Games

Controlled entity hybrid games in accordance with many embodiments of the invention can operate locally while being network connected to draw services from remote locations or to communicate with other controlled entity hybrid games. In many embodiments, operations associated with a controlled entity hybrid game such as (but not limited to) processes for calculating score or RWC and GWC tracking can be performed across multiple devices. These multiple devices can be implemented using a single server or a plurality of servers such that a controlled entity hybrid game is executed as a system in a virtualized space, such as (but not limited to) where the RWE and GWE are large scale centralized servers "in the cloud" coupled to a plurality of widely distributed ESE controllers or clients via the Internet.

In many embodiments, an RWE server can perform certain functionalities of a RWE of a controlled entity hybrid game. In certain embodiments, a RWE server includes a centralized odds engine which can generate random outcomes (such as but not limited to win/loss outcomes) for a gambling game, thereby eliminating the need to have that functionality of the RWE performed locally within the controlled entity hybrid game. The RWE server can perform a number of simultaneous or pseudo-simultaneous runs in order to generate random outcomes for a variety of odds percentages that one or more networked controlled entity hybrid games may require. In certain embodiments, an RWE of a controlled entity hybrid game can send information to a RWE server including (but not limited to) Table Ln-RWC tables, maximum speed of play for a gambling game, gambling game monetary denominations or any promotional RWC provided by the operator of the controlled entity hybrid game. In particular embodiments, a RWE server can send information to a RWE of a controlled entity hybrid game including (but not limited to) RWC used in the gambling game, player profile information or play activity and a profile associated with a player.

In several embodiments, a GWE server can perform the functionality of the GWE across various controlled entity hybrid games. These functionalities can include (but are not limited to) providing a method for monitoring high scores on select groups of games, coordinating interactions between gameplay layers, linking groups of games in order to join them in head-to-head tournaments, and acting as a tournament manager. A multilayer module can execute as part of a GWE server to coordinate the gameplay impact from player actions applied to player and/or player classes at various gameplay layers within a controlled entity hybrid game.

In a variety of embodiments, management of player profile information can be performed by a GWE patron management server separate from a GWE server. A GWE patron management server can manage information related to a player profile, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of a controlled entity hybrid game can send information to a GW patron management server including (but not limited to) GWC and RWC used in a game, player profile information, play activity and profile information for players and synchronization information between a gambling game and an entertainment game or other aspects of a controlled entity hybrid game. In particular embodiments, a GW patron management server can send information to a GWE of a controlled entity hybrid game including (but not limited to) entertainment game title and type, tournament information, Table Ln-GWC tables, special offers, character or profile setup and synchronization information between a gambling game and an entertainment game or other aspects of a controlled entity hybrid game. A multilayer module can execute as part of a GWE patron management server to coordinate the gameplay impact from player actions applied to players and/or player classes at various gameplay layers within a controlled entity hybrid game.

In numerous embodiments, an ESE server provides a host for managing head-to-head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

In several embodiments, a multilayer server can be connected with a controlled entity hybrid game and can implement a multilayer module to coordinate the activities of a controlled entity hybrid game. A multilayer module can execute as part of a multilayer server to coordinate the gameplay impact from player actions applied to players and/or player classes at various gameplay layers within a controlled entity hybrid game. In numerous embodiments, a multilayer server can be part of a distributed system where processes of a multilayer server occur across different multilayer servers of a multilayer server system.

Servers connected via a network to implement controlled entity hybrid games in accordance with many embodiments of the invention can communicate with each other to provide services utilized within a controlled entity hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the controlled entity hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of a controlled entity hybrid game tournament. Typically a GWE (such as a GWE that runs within a controlled entity hybrid game or on a GWE server) is not aware of the relationship of itself to the rest of a tournament since in a typical configuration the actual tournament play is managed by the ESE server. Therefore, management of a controlled entity hybrid game tournament can include (but is not limited to) tasks such as: conducting tournaments according to system programming that can be coordinated by an operator of the controlled entity hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of a controlled entity hybrid game, exchange of data necessary to link a player's player profile to their ability to participate in various forms of sponsored gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular controlled entity hybrid game, as recorded in their player profile, determining a player's play and gambling performance for the purposes of marketing intelligence, and logging secondary drawing awards, tournament prizes, RWC and GWC into the player profile.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with a controlled entity hybrid game locally. In certain embodiments, a server is a server system including a plurality of servers, where software may be run on one or more physical devices. Similarly, in particular embodiments, multiple servers may be combined on a single physical device.

Figure 2:
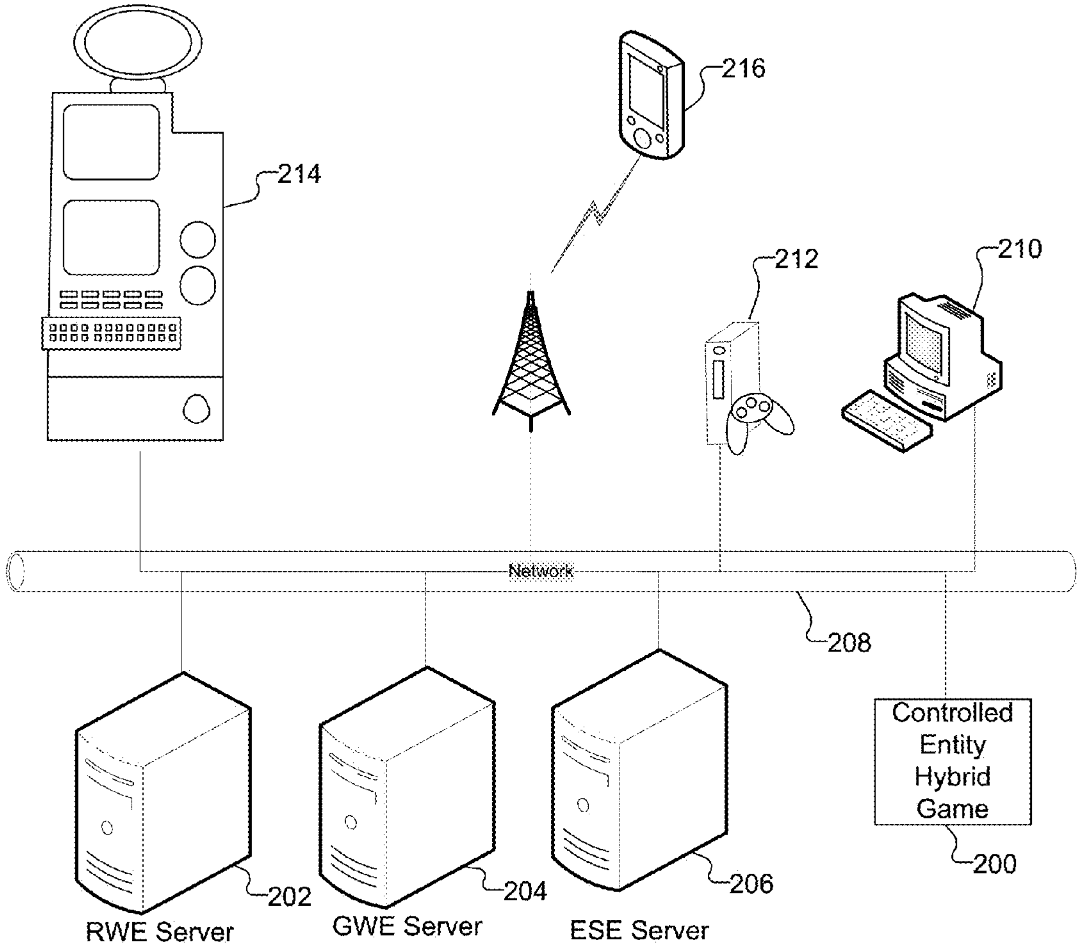
FIG. 2 is a system diagram that illustrates a network distributed controlled entity hybrid game in accordance with an embodiment of the invention.

Various components of controlled entity hybrid games in accordance with many embodiments of the invention can be networked with remote servers in various configurations. A networked controlled entity hybrid game in accordance with an embodiment of the invention is illustrated in FIG. 2. The networked controlled entity hybrid game 200 is connected with an RWE server 202, a GWE server 204, and an ESE server 206 over a network 208, such as (but not limited to) the Internet. Servers networked with a networked controlled entity hybrid game 200 can also communicate with each of the components of a networked controlled entity hybrid game and amongst the other servers in communication with the networked controlled entity hybrid game 200.

In various embodiments, controlled entity hybrid games may be implemented, in whole or in part, on a variety of devices, including, but not limited to, a personal computer 210, a gaming console 212, a casino game housed in a cabinet 214, or a mobile device 216 such as a tablet computer or smartphone.

Although various networked controlled entity hybrid games are discussed above, networked controlled entity hybrid games can be configured in any manner as appropriate to the requirements of a specific application in accordance with embodiments of the invention.

Among factors in the functioning of a controlled entity hybrid game are one or more enabling elements (EE), one or more actionable elements (AE), one or more controlled entities (CE) and their interoperability with the game.

EEs for a controlled entity hybrid game include types of consumable commodities and/or accumulating elements in a game context utilized to play and operate characters or take actions in a game space. Types of EE include (but are not limited to): weapons ammunition, health points in a fighting game, potions in the case of a fantasy game, fuel in the case of a driving game, time in the case of a game where one races against the clock to achieve some objective, armies in the case of a military strategy game, or downs in the case of football. The nature of EE is a function of the type of entertainment game executed on the ESE and its structure. In some embodiments, the consumption of EE in the process of playing the ESE entertainment game would trigger gambling plays on the RWE portion of the controlled entity hybrid game. In various embodiments, it is also possible that the events of or acts of accumulation of EE in the entertainment game might also trigger RWE gambling plays in the same manner that consumption of EE would. Additionally, in some embodiments, it is possible that EE is recycled. The recycling or reuse of EE might also trigger RWE gambling plays. This is to say that games could use either EE consumption, EE accumulation, EE recycling or a combination of events to trigger RWE wagers. The correlation of what events resulting in the accumulation or consumption of EE might trigger RWE plays, and when, and the amount of RC wagered as a result of these events, would be a function of algorithms and formulae operating within the GWE and the controlled entity hybrid game. It should be understood that as consistent with controlled entity hybrid game methods that other triggers for RWE plays other than EE consumption or accumulation could be possible.

Like EE, an AE can initiate a gambling game by committing RC to the gambling proposition within the RWE. Like an EE, AE may be consumed, recycled or accumulated. AEs, are tied to specific player decisions or player directed actions that are undertaken in the context of the entertainment game, the outcome of those decisions or actions, or a game event or milestone points, or the transpiring of real or virtual game time in the process of playing the entertainment game. AEs, are constructs within the GW affected by player world decisions or actions subject to various formulae and algorithms as to whether the player world action or decision causes the AE to transpire.

A controlled entity (CE) includes, but is not limited to, a player's game world character, an entity, an inanimate object, a device or other object under control of the player.

Figure 3:
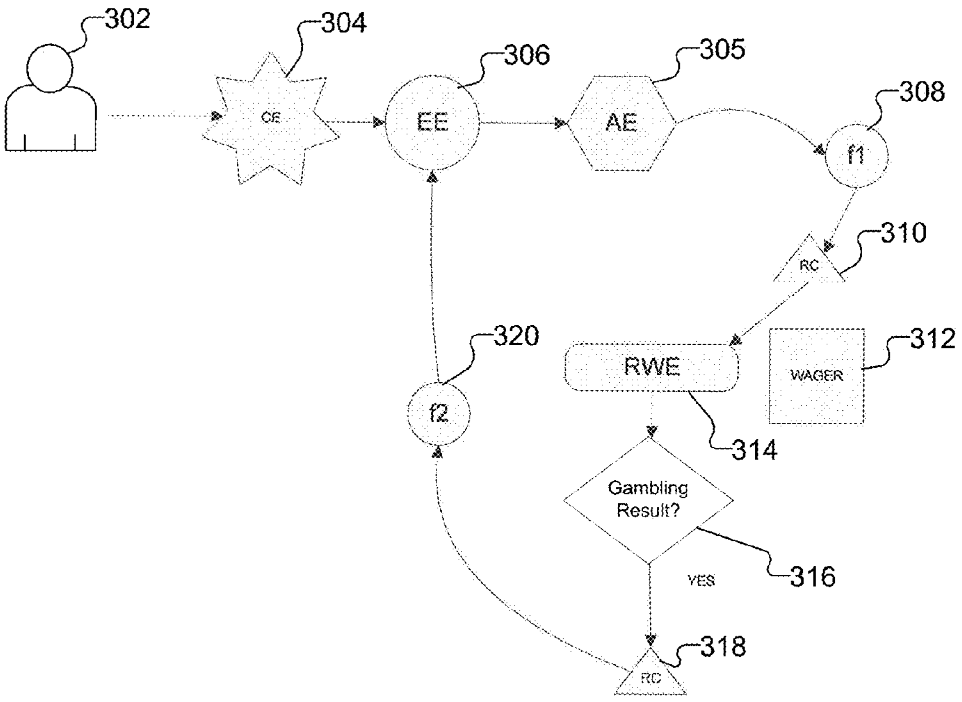
FIG. 3 is a flow chart illustrating a process of using a controlled entity in accordance with an embodiment of the invention.

FIG. 3 is a flow chart illustrating a process of using a controlled entity in accordance with an embodiment of the invention. In FIG. 3, a player 302 instructs a controlled entity 304 as part of gameplay of a controlled entity hybrid game. The controlled entity 304 consumes an entertainment game element, such as EE 306. This in turn causes an AE 305 to take place, which in turn triggers a wager 312 in an RWE 314. The gambling game result 316 then creates as output a change in the amount of RC 318 and a change in the amount of the EE 306. The amount of RC 310 committed to the wager is a function (f1) 308 of the AE 305 in this case, and the result of the wager, if positive, generates RC 318. The gambling result also, by function f2 320, facilitates a further change in EE 306. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In a particular embodiment, a controlled entity hybrid game implements a racing game. In such a game, gasoline is treated as an EE and is consumed as a car, which is an example of a CE is driven around a track by a player. Upon passing a starting line (i.e. completing one lap), an AE occurs (i.e. the negotiation of one lap), which causes an amount of RC to be committed to a gambling game as a function of f1 (a relationship between AE and RC). If the gambling game has a positive outcome and returns RC, the CE (in this case the car) also realizes an increase in gasoline (EE) as a function of function f2. The player instructs the CE in this embodiment by turning a steering wheel, and depressing brake and accelerator pedals.

Figure 4:
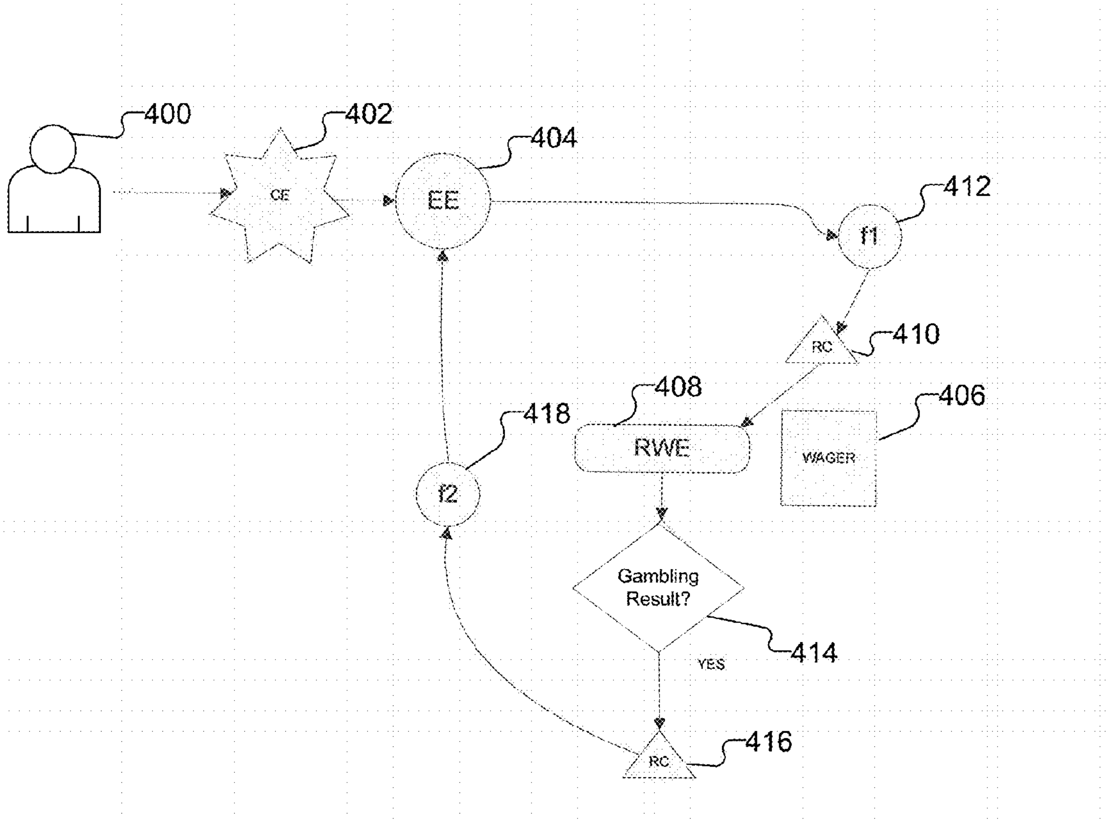
FIG. 4 is a flow chart illustrating another process of using a controlled entity in accordance with an embodiment of the invention.

FIG. 4 is a flow chart illustrating another process of using a controlled entity in accordance with an embodiment of the invention. In FIG. 4, a player 400 instructs a controlled entity 402 and the controlled entity consumes an EE 404, which in turn triggers a wager 406 in the RWE 408. A gambling game result 414 of the wager then creates as output a change in an amount of RC 416 and a change in an amount of EE 44. The amount of RC 410 committed to the wager is a function (f1) 412 of EE 404 in this case, and the result 414 of the wager 406, if positive, generates RC 416. The gambling result also, by function (f2) 418, facilitates a further change in EE 44. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In a specific embodiment, a racing game is implemented using a controlled entity hybrid game. Gasoline (EE) is consumed as the car (Controlled Entity—CE) is driven around the track. Upon consumption of a discrete amount of EE, an amount of RC to be committed to the game as a function of f1 (a relationship between EE and RC). If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals.

Figure 5:
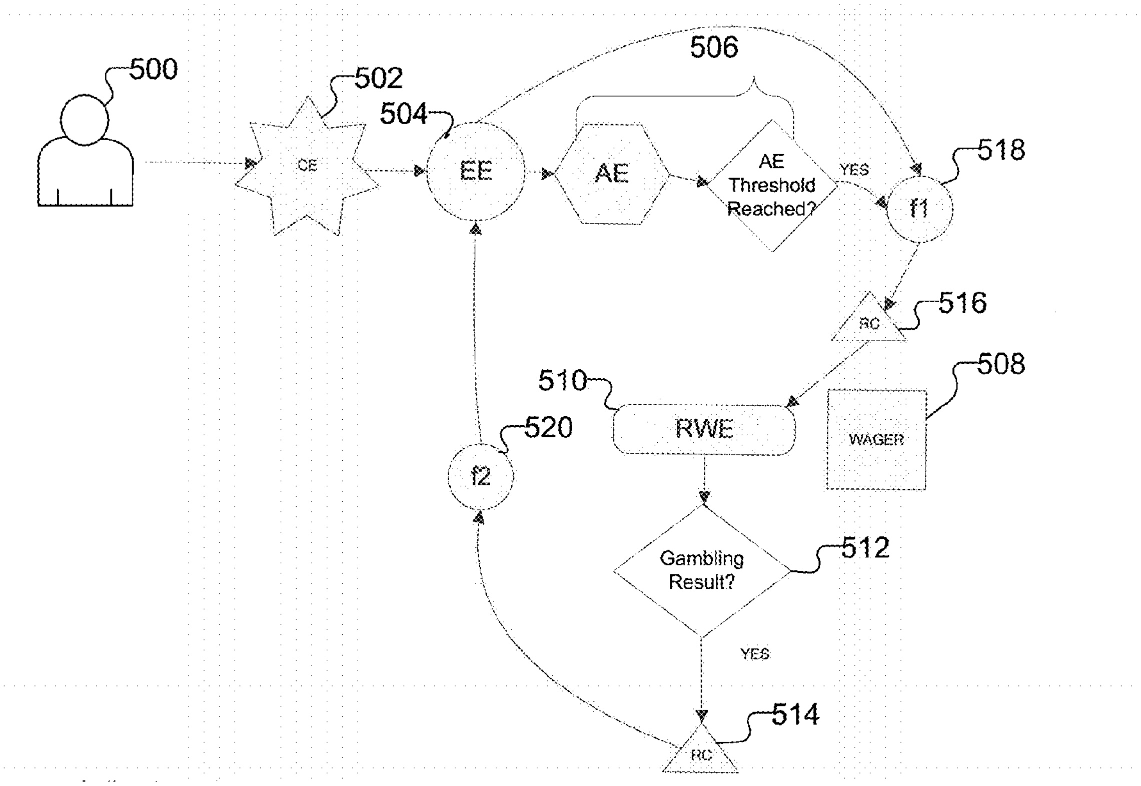
FIG. 5 is a flow chart illustrating another process of using a controlled entity in accordance with an embodiment of the invention.

FIG. 5 is a flow chart illustrating another process of using a controlled entity in accordance with an embodiment of the invention. In FIG. 5, a player 500 instructs a controlled entity 502 which in turn consumes an EE 504. This in turn causes an AE 506 to take place, which in turn triggers a wager 508 in an RWE 510. A gambling game result 512 then creates as output a change 514 in the amount of RC and a change in the amount of EE 504. An amount of RC 516 committed to the wager is a function (f1) 518 of EE 504 and not AE 506 in this case, and the result of the wager, if positive, generates RC. The gambling result also, by function f2 520, facilitates a further change in EE 504. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In one embodiment, a racing game is implemented using a controlled entity hybrid game. Gasoline (EE) is consumed as the car (Controlled Entity—CE) is driven around the track. Upon driving 1 km an AE occurs, which causes an amount of RC to be committed to the game as a function of f1 (a relationship between EE and RC). If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1').

Figure 6:
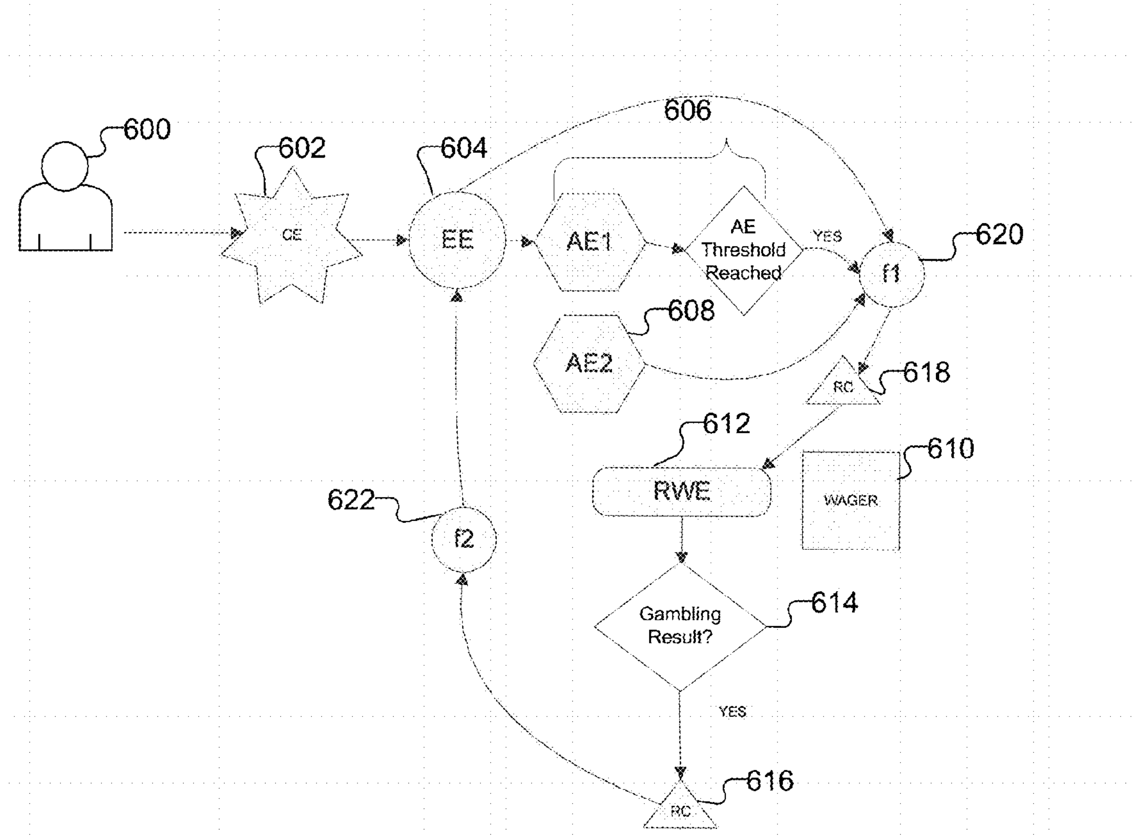
FIG. 6 is a flow chart illustrating another process of using a controlled entity in accordance with an embodiment of the invention.

FIG. 6 is a flow chart illustrating another process of using a controlled entity in accordance with an embodiment of the invention. In FIG. 6 a player 600 instructs a controlled entity 602 which in turn consumes an EE 604. This in turn causes one or more AEs, such as AE1 606 and AE2 608, to take place, which in turn triggers a wager 610 in the RWE 612. The gambling game result 614 then creates as output a change in the amount of RC 616 and a change in the amount of EE 604. The amount of RC 618 committed to the wager is a function (f1) 620 of EE 604 and AE2 608, and the result of the wager, if positive, generates RC 616. The gambling result also, by function f2 622, facilitates a further change in EE 604. There may be one or more (n) AEs, such as AE2 608 affecting the amount of RC 618 committed to the wager, where n is greater or equal to 1. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In one embodiment, a racing game is implemented using a controlled entity hybrid game. Gasoline (EE) is consumed as the car (Controlled Entity—CE) is driven around the track. Upon driving 1 km an AE1 occurs, which causes an amount of RC to be committed to the game as a function of f1 (a relationship between EE, AE2 and RC). In this embodiment, AE2 is the number of competitor cars (either computer controlled or operated by competitive players via their CEs) that are passed while achieving AE1. If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1').

Figure 7:
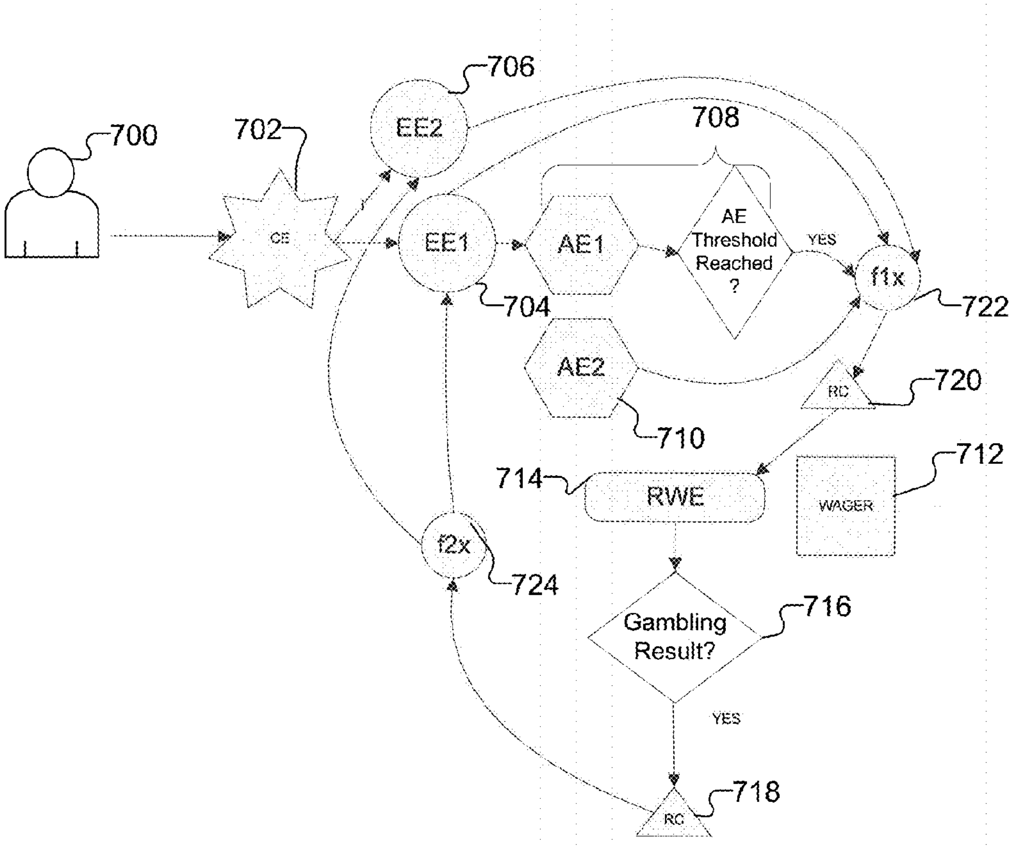
FIG. 7 is a flow chart illustrating another process of using a controlled entity in accordance with an embodiment of the invention.

FIG. 7 is a flow chart illustrating another process of using a controlled entity in accordance with an embodiment of the invention. In FIG. 7, a player 700 instructs a controlled entity 702 which in consumes one or a multitude of EE, such as EE1 704 and EE2 706. This in turn causes one or more AE to take place, such as AE1 708 and AE2 710, which in turn triggers a wager 712 in an RWE 714. A gambling game result 716 then creates as output a change in the amount of RC 718 and a change in the amount of one or more EE, such as EE1 704 and EE2 706. The amount of RC committed 720 to the wager is governed by functions (f1*x*) 722 taking as arguments one or a multitude each of EE and AE, such as EE2, EE2, AE1 and AE2, and the result of the wager, if positive, generates RC. The gambling result also, by a set of functions f2*x* 724, facilitates a further change in one or a multitude of EE, such as EE1 and EE2. There may be n AE (and m EE) affecting the amount of RC committed to the wager, where one of (m and n) is greater than zero and the other of (m and n) is zero or greater than zero. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In one embodiment, a racing game is implemented using a controlled entity hybrid game. An example would be a racing game. Gasoline (EE1) and driver stamina (EE2) is consumed as the car (Controlled Entity—CE) is driven around the track. Upon driving 1 km an AE1 occurs, which causes an amount of RC to be committed to the game as a function of f1*x* (a set of relationships between EE1, EE2, AE2 and RC). In this example, AE2 is the number of competitor cars (either computer controlled or operated by competitive players via their CEs) that are passed while achieving AE1. If the gambling game has a positive outcome and returns RC, the controlled entity (in this case the car) also realizes an increase in gasoline (EE1) and/or EE2 (driver stamina) as a function of function f2*x*. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1*x*').

Figure 8:
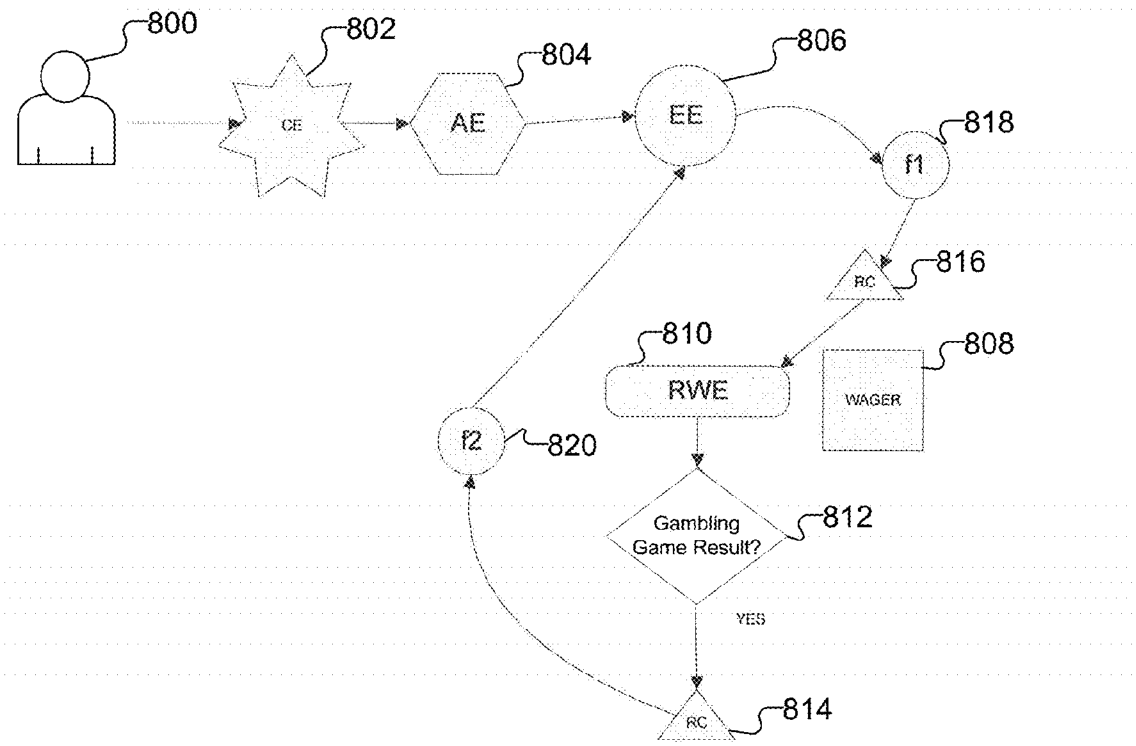
FIG. 8 is a flow chart illustrating another process of using a controlled entity in accordance with an embodiment of the invention.

FIG. 8 is a flow chart illustrating another process of using a controlled entity in accordance with an embodiment of the invention. In FIG. 8, a player 800 instructs controlled entity 802 which in turn undertakes an actionable element (AE) 804. This in turn causes EE 806 to be consumed, which in turn triggers a wager 808 in the RWE 810. A gambling game result 812 then creates as output a change in the amount of RC 814 and a change in the amount of EE 806. The amount of RC 816 committed to the wager is a function (f1) 818 of EE 806, and the result of the wager, if positive, generates RC. The gambling result also, by function f2 820, facilitates a further change in EE 806. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In one embodiment, an adventure game is implemented in a controlled entity hybrid game. The controlled entity in this case is an adventurer. The adventurer opens a safe (the AE) and in so doing consumes a certain amount of health points (the EE). An amount of RC is committed to the gambling game as a function of the amount of EE consumed. The gambling game returns a specific amount of RC, which if greater than zero generates a change in the adventurer's health points (EE) via function f2. It should be understood that each of the aforementioned elements of certain embodiments (i.e. multiple EE, AE, their combination affecting wagering, the need to undertake a specific AE to launch a wager, etc.) can likewise be applied to the above construct, where the causality between AE and EE has been inverted.

Figure 9:
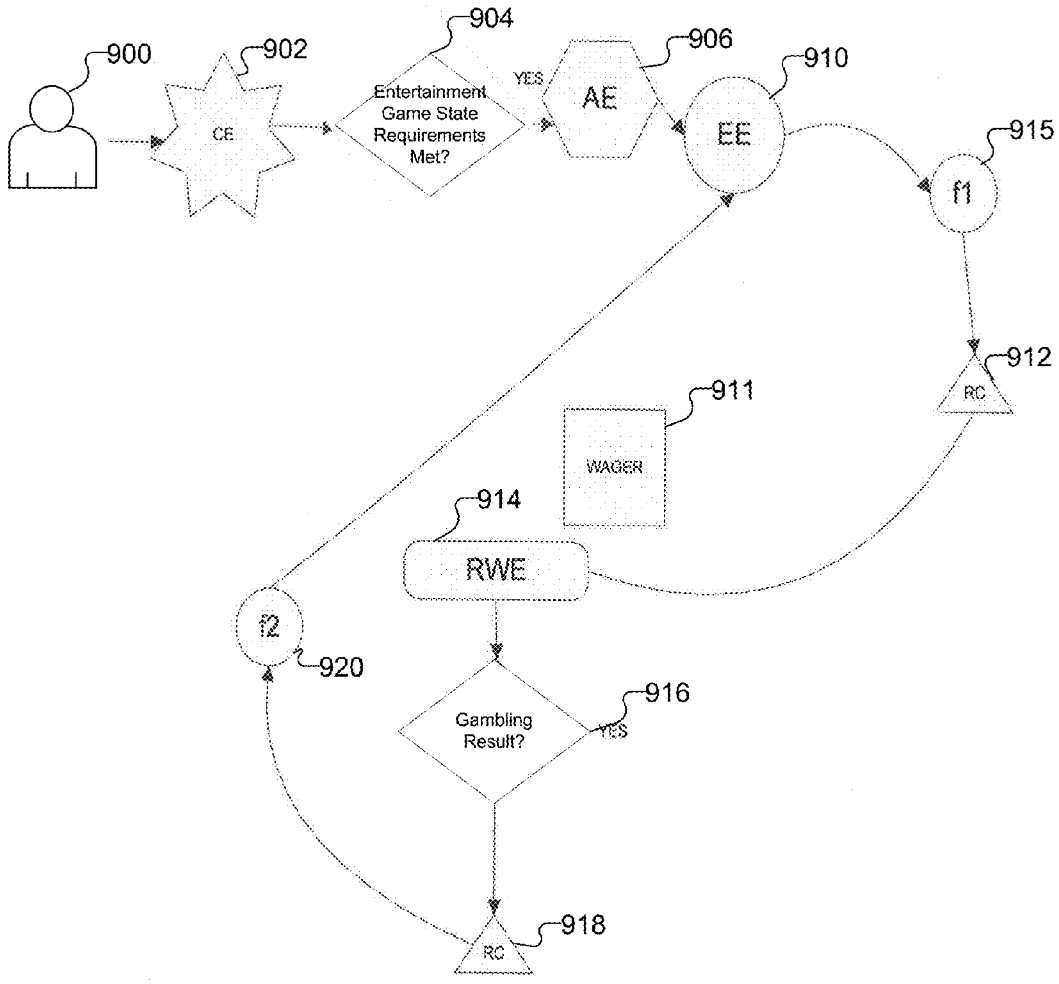
FIG. 9 is a flow chart illustrating another process of using a controlled entity in accordance with an embodiment of the invention.

FIG. 9 is a flow chart illustrating another process of using a controlled entity in accordance with an embodiment of the invention. In FIG. 9, the diamond 904 represents an area of interest within an entertainment game. Specifically, before a CE can undertake an action certain entertainment game state requirements may be required to be met. This can include, but is not limited to, characteristics or attributes of the CE, possessions of the CE, the state of game play generally, the value of various game objects, etc. In a particular embodiment, in an adventure game, a CE is directed to open a door, as indicated by AE 906. This would in turn cause the consumption of a certain amount of health points (EE) 910, which would in turn trigger the commitment as a wager 911 of RC 912 to a gambling game within an RWE 914. The amount of RC committed is determined by a function f1 915. Upon determination of a gambling result 916, an amount of RC 918 is incremented or decremented. The resultant change in RC results in a change in EE 910 via function f2 920. However, in such an embodiment, it is not possible for the CE to undertake this AE (opening the door) without possession of a specific key (i.e. a game object) or if there is inadequate ambient lighting (i.e. a game state), or if the CE's health points are too low (i.e. the characteristic of the CE). In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In an embodiment, in an adventure game implemented using a controlled entity hybrid game, a CE is directed to open a door. This would in turn cause the consumption of a certain amount of health points (EE), which would in turn trigger the commitment of RC to a gambling game within the RWE, etc. However, it is not possible for the CE to undertake this AE (opening the door) without possession of a specific key (i.e. a required object, or RO) or if there is inadequate ambient lighting (i.e. a Required Environmental Condition, or REC), or if the CE's health points are too low (i.e. a Controlled Entity Characteristic, or CEC).

Figure 10:
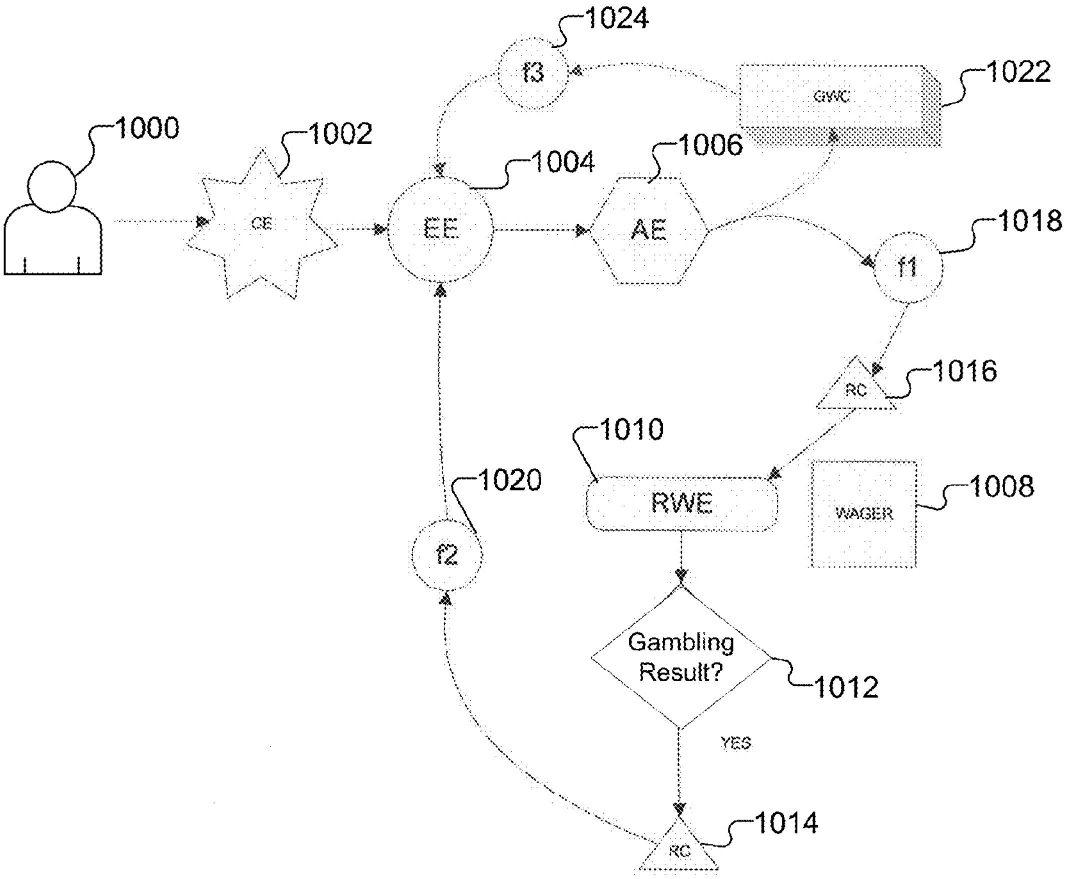
FIG. 10 is a flow chart illustrating another process of using a controlled entity in accordance with an embodiment of the invention.

FIG. 10 is a flow chart illustrating another process of using a controlled entity in accordance with an embodiment of the invention. In FIG. 10, a player 1000 instructs a controlled entity 1002 as part of gameplay of a controlled entity hybrid game. The controlled entity 1002 consumes an entertainment game element, such as EE 1004. This in turn causes an AE 1006 to take place, which in turn triggers a wager 1008 in an RWE 1010. The gambling game result 1012 then creates as output a change in the amount of RC 1014 and a change in the amount of the EE 1004. The amount of RC 1016 committed to the wager is a function (f1) 1018 of the AE 1006 in this case, and the result of the wager, if positive, generates RC 1014. The gambling result also, by function f2 1020, facilitates a further change in EE 1004. In various embodiments, an amount of EE may be incremented on a positive gambling result, or an amount of EE may be decremented on a positive gambling result, or an amount of EE may be incremented on a negative gambling result, or an amount EE may be decremented. In still further embodiments, the nature, character, type or attributes of an EE may be changed. Entertainment game play causes game world credit (GWC) 1022 to be accumulated when certain events take place, achievements won, enemies vanquished, laps driven, etc., all examples of AE. In some embodiments, a feedback loop between GWC 1022 and EE 1004 exists such that the amount of EE related to the consumption of the CE 1002 is altered as a function of f3 1024, where f3 takes as an (and in some cases its only) argument the amount of GWC or the change in GWC or a GW result.

In one embodiment, a racing game is implemented using a controlled entity hybrid game, where the car is CE, gasoline is EE, and each km driven is an AE. Gambling game wagers, and the commitment of RC are initiated for each AE (km driven). The result of the wager drives a change in RC, and through f2 may alter the amount of EE available to the car (CE). The skill demonstrated by the player through control of his/her CE over that period drives a change in GWC (e.g. driving a km under a certain time generates more GWC, crashing less adds to GWC, etc.), which in turn, via f3, causes additional EE (i.e. gas) to be accumulated, independent of the gambling game result.

Figure 11:
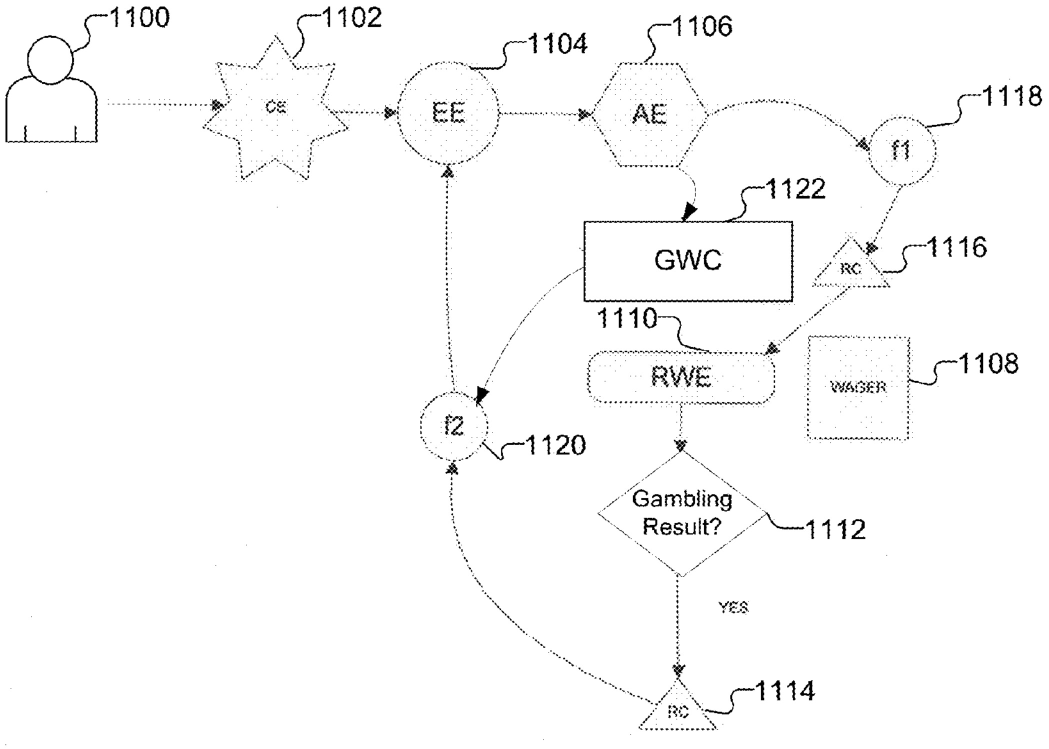
FIG. 11 is a flow chart illustrating another process of using a controlled entity in accordance with an embodiment of the invention.

FIG. 11 is a flow chart illustrating another process of using a controlled entity in accordance with an embodiment of the invention. In FIG. 11, a player 1100 instructs a controlled entity 1102 as part of gameplay of a controlled entity hybrid game. The controlled entity 1102 consumes an entertainment game element, such as EE 1104. This in turn causes an AE 1106 to take place, which in turn triggers a wager 1108 in an RWE 1110. The gambling game result 1112 then creates as output a change in the amount of RC 1114 and a change in the amount of the EE 1104. The amount of RC 1116 committed to the wager is a function (f1) 1118 of the AE 1106 in this case, and the result of the wager, if positive, generates RC 1114. The gambling result, by function f2 1120, also facilitates a further change in EE 1104. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result. A function, f2 1120, may also alter the amount of EE 1104 as a function both of the output of the gambling game, and also the amount of GWC 1122, the change in GWC, or a GW result or a multitude of these factors.

Figure 12:
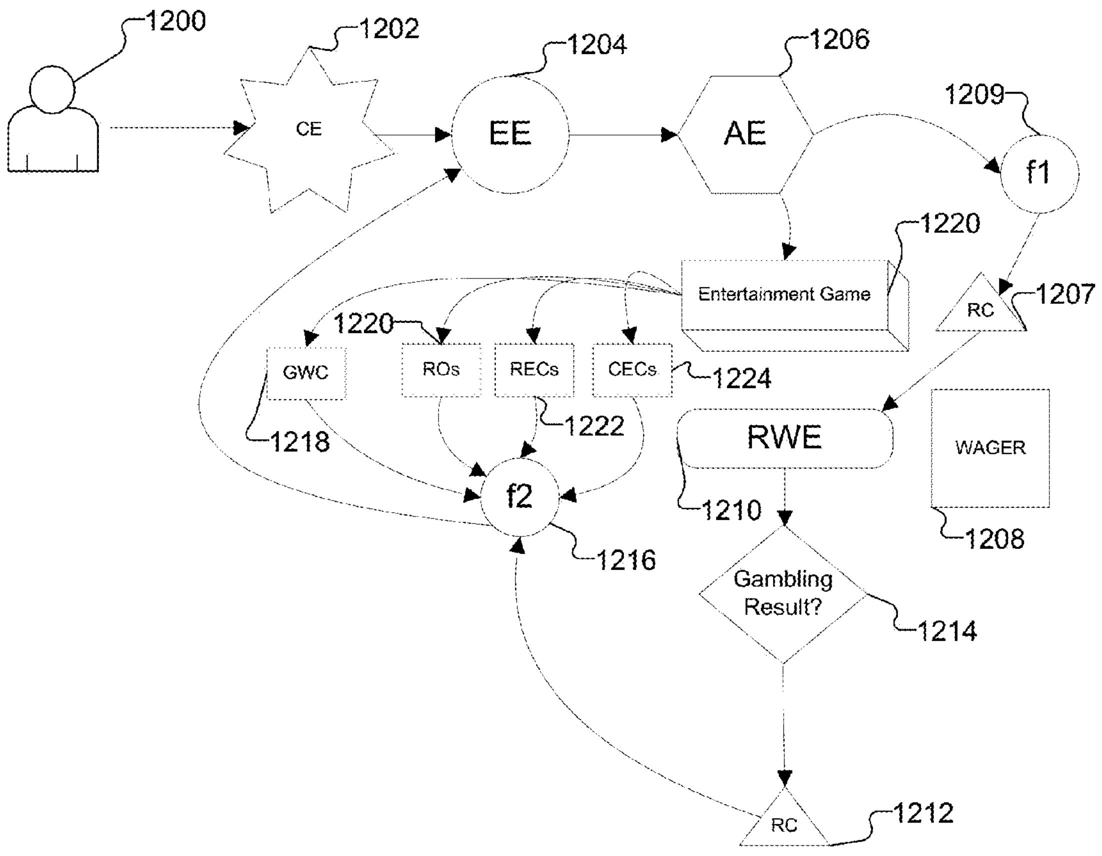
FIG. 12 is a flow chart illustrating another process of using a controlled entity in accordance with an embodiment of the invention.

FIG. 12 is a flow chart illustrating another process of using a controlled entity in accordance with an embodiment of the invention. As illustrated in FIG. 12, a player 1200 instructs a controlled entity 1202 to consume an enabling element 1204 within an entertainment game 1220. As the controlled entity consumes the enabling element, an actionable element 1206 is encountered and interacted with in the entertainment game. Interaction with the actionable element triggers a wager 1208 to be placed in a gambling game implemented within an RWE 1210. An RC amount 1207 of the wager is determined by a function f1 1209 which takes as an argument the particular action element that triggered the wager. An RC amount 1212 is either incremented or decremented based on a gambling result 1214 of the gambling game. A function, f2 1216, alters an amount of EE 1204 as a function both of the gambling result 1214 of the gambling game implemented in the RWE 1210, and also of an amount of GWC 1218, a change in GWC, or a GW result, a variable within the entertainment game, or a multitude of these factors and or other inputs, including but not limited to a required object 1220, a required environmental condition 1222 of the entertainment game, or a controlled entity condition 1224. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

In an embodiment, an adventure game is implemented using a controlled entity hybrid game. In the adventure game, where the EE is player health points, and opening a safe (the AE) initiates, through f1, a gambling game that consumes a specified amount of RC. The gambling game, in this example, returns a higher amount of RC, which augments the player's account. However, when the safe is opened in the entertainment game, an explosion ensues (an entertainment game event), which effects CEC such that f2 returns a null value to EE.

Figure 13:
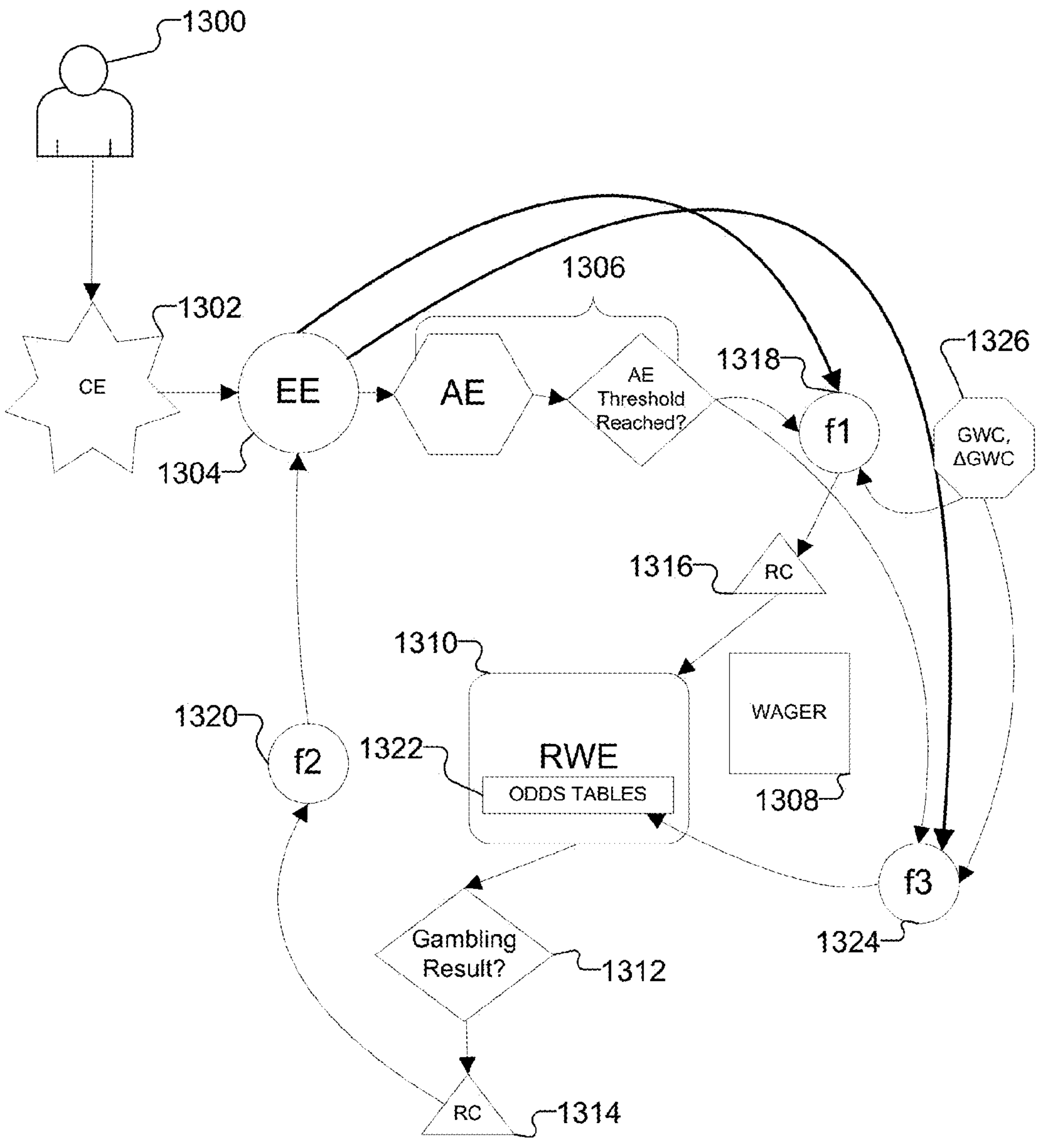
FIG. 13 is a flow chart illustrating another process of using a controlled entity in accordance with an embodiment of the invention.

FIG. 13 is a flow chart illustrating another process of using a controlled entity in accordance with an embodiment of the invention. As illustrated in FIG. 13, a player 1300 instructs a controlled entity 1302 of an entertainment game (not shown). In turn, the controlled entity consumes an EE 1304. This in turn causes an AE 1306 to take place, which in turn triggers a wager 1308 in a gambling game implemented in an RWE 1310. A gambling game result 1312 then creates as output a change in the amount of RC 1314 and a change in the amount of EE 1304. The amount of RC 1316 committed to the wager 1308 is a function (f1) 1318 of EE 1304 and not of AE 1306 in this case, and the result of the wager, if positive, generates RC. The gambling result, by function f2 1320, facilitates a further change in EE 1304. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

The odds or pay table 1322 of the gambling game implemented by RWE 1310 are affected by f3 1324, a function that takes as arguments a range of variables from the entertainment game, as well as the operator (casino) including but not limited to GWC 1326 of the entertainment game.

In an embodiment, a racing game is implemented using a controlled entity hybrid game. In the racing game, gasoline (EE) is consumed as the car (Controlled Entity—CE) is driven around the track. Upon driving 1 km an AE occurs, which causes an amount of RC to be committed to the game as a function of f1 (a relationship between EE and RC). In this case, the more gas consumed, the less RC committed to the gambling game. The odds of the gambling game are adjusted as a function of f3; in this example, the more gas (EE) consumed, the worse the odds in the gambling game. If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals.

In another embodiment, the amount of RC committed to the gambling game is a function of the amount of gas consumed (EE). The more gas consumed, the more RC committed to the gambling game as dictated by function f1. The odds of the gambling game improve as a function of the number of crashes (fewer crashes leads to better odds), cars passed (more cars passed leads to better odds), and time to complete the lap (shorter time leads to better odds). In this example, which is not meant to be exhaustive, f3 does not take EE as an argument in establishing the odds tables in the RWE.

Figure 14:
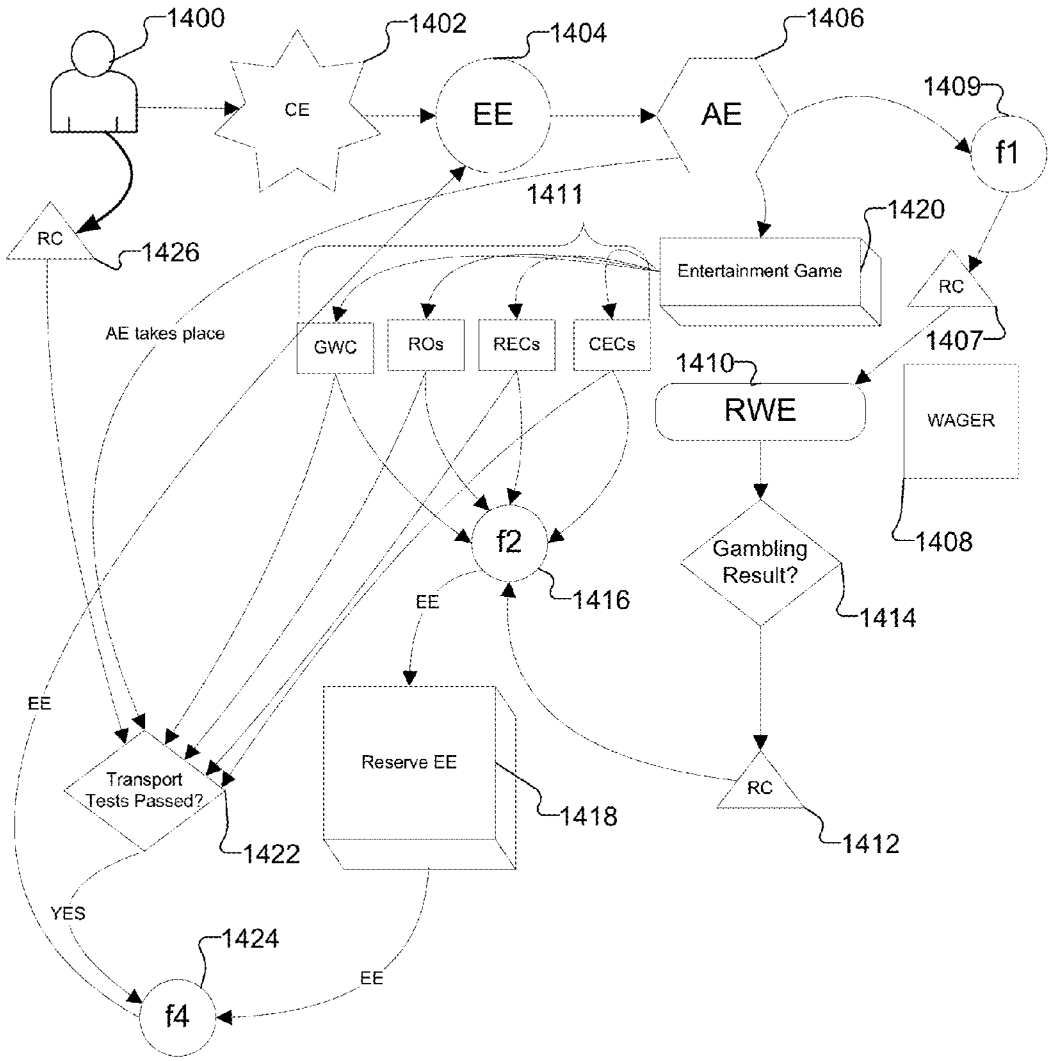
FIG. 14 is a flow chart illustrating another process of using a controlled entity in accordance with an embodiment of the invention.

FIG. 14 is a flow chart illustrating another process of using a controlled entity in accordance with an embodiment of the invention. As illustrated in FIG. 14, a player 1400 instructs a controlled entity 1402 to consume an enabling element 1404 within an entertainment game 1420. As the controlled entity consumes the enabling element, an actionable element 1406 is encountered and interacted with in the entertainment game. Interaction with the actionable element triggers a wager 1408 to be placed in a gambling game implemented within an RWE 1410. An RC amount 1407 of the wager is determined by a function f1 1409. An RC amount 1412 is either incremented or decremented based on a gambling result 1414 of the gambling game of the RWE 1410. EE generated as a result of the gambling game outcome 1414 and function f2 1416 is accumulated in a reserve EE reservoir 1418 resident in the GWE. The function, f2 1416, alters an amount of EE in the reserve EE reservoir as a function both of the gambling result 1414 of the gambling game implemented in the RWE 1410, and also of an amount of one or more entertainment game variables 1411 including but not limited to GWC, a change in GWC, or a GW result, a variable within the entertainment game, or a multitude of these factors and or other inputs, a required object (RO), a required environmental condition (REC) of the entertainment game, and a controlled entity condition (CEC). In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed based on the gambling result.

Before the reserve EE 1418 can be accessed as EE 1404 within the entertainment game, one or a multitude of transport tests 1422 must be passed. The transport tests are undertaken as a result of one or more triggering events within the entertainment game. In numerous embodiments, one or more entertainment game changes in state, events, variables or occurrences, including but not limited to, an AE 1406, entertainment game variables 1411 GWC, ROs, RECs, and CECs, consumption of EE and accumulation of EE can serve as the trigger to cause one or more transport tests to be undertaken. In many embodiments, one or more transport tests can also be initiated by more than one such element, or require the combination of a multitude of such elements to have specified values to initiate the one or more transport tests. In some embodiments, each transport test can also have its own set of triggers. In numerous embodiments, the transport tests can also take arguments from the GWE and RWE, including but not limited to the amount of RC associated with the game by the player, player information and casino driven variables.

When one or more transport tests returns a "YES", a function, f4 1424, which may take as arguments any and all items used as arguments in the one or more transport tests, namely one or more variables associated with the entertainment game 1420, as well as other arguments from the controlled entity hybrid game including but not limited to an amount of RC 1426 associated with the game by the player, information about the player and casino driven variables to ascertain how much EE should be shifted from reserve EE 1418 to active EE 1404.

In one embodiment, a racing game is implemented in a controlled entity hybrid game. In the racing game, EE is fuel. The CE initiates a gambling game every time a lap is completed (the AE). The amount of RC committed to the gambling game is a function of having completed the lap (the AE). NB—all of the prior EE, AE, and related functions can be substituted into this embodiment. The amount of EE to be stored in the reserve EE is established by f2 as a function of the amount of RC won, and a range of game conditions. In such a game, the amount of fuel consumed to complete the lap, the number of competitors passed, the amount of body damage sustained by the CE (the car) all factor into the amount of EE that the player will ultimately be able to gain access to. In this game, reserve EE, fuel, accumulation correlates to the storage of fuel in the pits. When the CE enters the pits, a specific REC is tested by a transport test, the amount of fuel stored in that CE's pit (i.e. the Reserve EE) can be pumped into the car so long as (a) the player has adequate RC to support that amount of EE, (b) the fuel tank on the CE is large enough, and if there is ample time to pump the fuel into the car (i.e. car body damage can affect the amount of time available for fueling).

Various Initiation Modes

EEs for a hybrid game include consumable commodities and/or accumulating elements in an entertainment game context necessary to play and operate characters or take actions in the entertainment game space. A non-exhaustive list of embodiments of EE include but are not limited to: weapons, ammunition, health points in a fighting game, potions in the case of a fantasy game, fuel in the case of a driving game, time in the case of a game where one races against the clock to achieve some objective, armies in the case of a military strategy game, or downs in the case of football. The nature of EE is a function of the type of entertainment game executed on an ESE and its structure. In various embodiments, the consumption of EE in the process of playing an ESE entertainment game would trigger gambling plays on the RWE portion of the hybrid game. In a hybrid game invention, it is also possible that the events of or acts of accumulation of EE in the entertainment game might also trigger RWE gambling plays in the same manner that consumption of EE would. Additionally, in the hybrid game invention, it is possible that EE is recycled. The recycling or reuse of EE might also trigger RWE gambling plays. This is to say that games could use either EE consumption, EE accumulation, EE recycling or a combination of events to trigger RWE wagers. The correlation of what events resulting in the accumulation or consumption of EE might trigger RWE plays, and when, and the amount of RC wagered as a result of these events, would be a function of algorithms and formulae operating within the GWE and the hybrid game. It should be understood that as consistent with hybrid game methods that other triggers for RWE plays other than EE consumption or accumulation could be possible.

Like EE, an AE can initiate a gambling game by committing RC to the gambling proposition within the RWE. Like an EE, AE may be consumed, recycled or accumulated. AEs are tied to specific player decisions or player directed actions that are undertaken in the context of the entertainment game, the outcome of those decisions or actions, or a game event or milestone points, or the transpiring of real or virtual game time in the process of playing the entertainment game. AEs are constructs within the GW, not the physical world, affected by physical world decisions or actions subject to various formulae and algorithms as to whether the physical world action or decision causes the AE to transpire.

Figure 15:
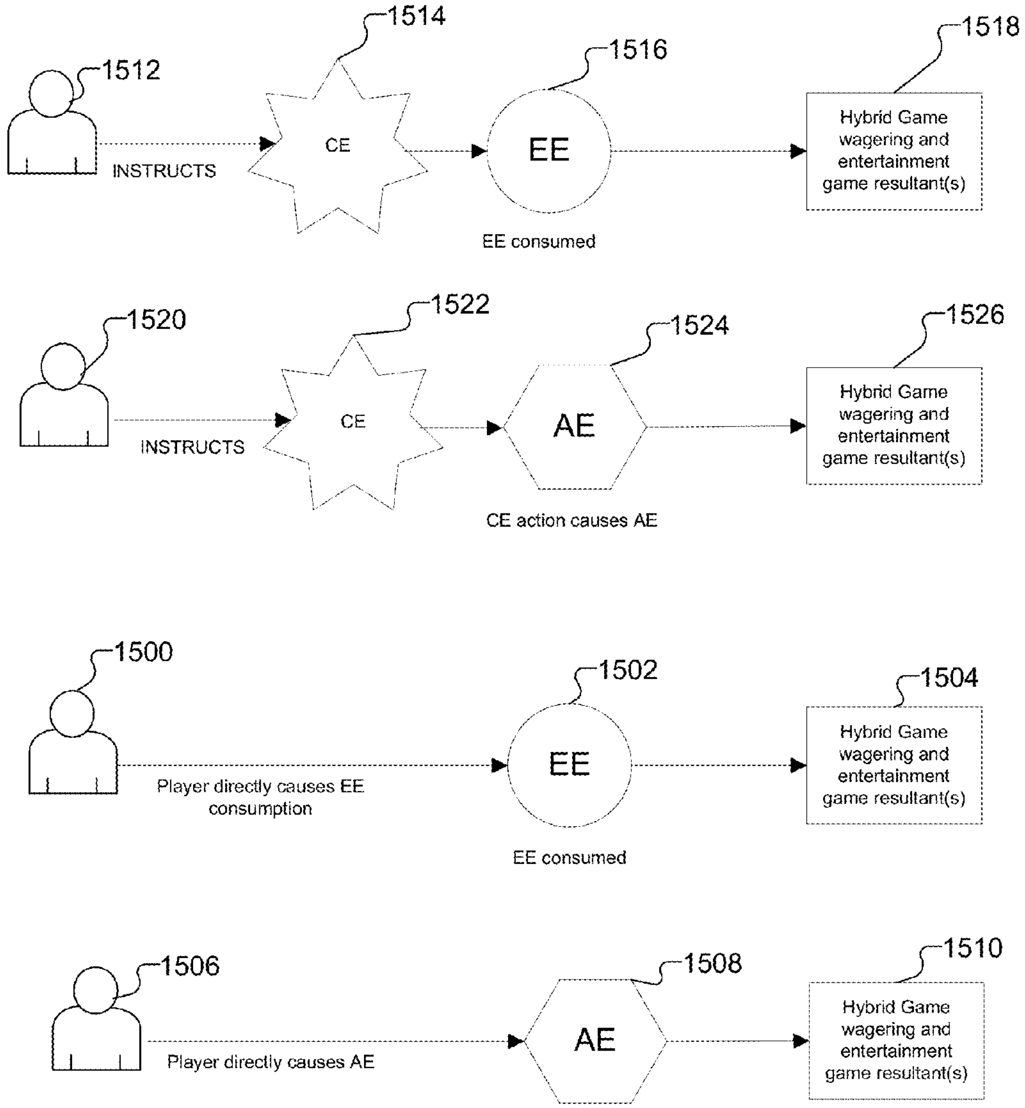
FIG. 15 is a flow chart illustrating initiation modes in accordance with embodiments of the invention.

FIG. 15 is a flow chart illustrating initiation modes in accordance with various embodiments of the invention. In some embodiments, a player's 1500 actions directly initiate consumption of EE 1502. Box 1504 labeled "hybrid game wagering and entertainment game resultant(s)" subsumes all actions that can be initiated as a function of the prior elements in any of the flow diagrams herein.

In numerous embodiments, a player's 1506 actions directly initiate an AE 1508. Box 1510 labeled "hybrid game wagering and entertainment game resultant(s)" subsumes all actions that can be initiated as a function of the prior elements in any of the flow diagrams herein.

In many embodiments, a player 1512 instructs a CE 1514 (character entity) which in turn initiates the consumption of EE 1516. Box 1518 labeled "hybrid game wagering and entertainment game resultant(s)" subsumes all actions that can be initiated as a function of the prior elements in any of the flow diagrams herein. In some embodiments, a player 1520 instructs a CE 1522 (character entity) which in turn initiates an AE 1524. Box 1526 labeled "hybrid game wagering and entertainment game resultant(s)" subsumes all actions that can be initiated as a function of the prior elements in any of the flow diagrams herein. In this regard the presence of a CE creates a layer of abstraction between the player and the EE consumption and/or AE initiation.

In numerous embodiments, such as in a 1st person shooter hybrid game without the CE construct, a player may pull a trigger on a gun-like game controller to directly initiate the consumption of EE (in this example, a bullet). In other embodiments, in an adventure hybrid game with the CE construct, a player may send his character into battle whereupon the CE, without direct input from the player, participates in a combat sequence that includes the firing of a gun one or multiple times (thereby consuming EE) in the context of parameters set by the player in advance of the battle.

In various embodiments, any and all of the combinations shown in this diagram can be present in a single hybrid game. It should be understood that there is no requirement that one, or a subset of these aspects, be used singularly. Multiple instances of the same type or different variations may be in effect simultaneously for a given player, different players may each participate in the hybrid game via different aspects (or multiple instances of the same type) of this invention at the same time in the context of a single hybrid game, and/or different aspects of this invention may be in force at different points of the hybrid game.

In some embodiments, a WWII tank battle game may have a strategic mode, whereby a player instructs a general (the CE) of her army to affect a battle plan. This may cause tanks (EE) to be committed to a battle. As the battle commences the player may enter a mode where she directly fires the gun of a tank at enemies (consuming shells, the EE) in an attempt to disable opponents' tanks.

Figure 16:
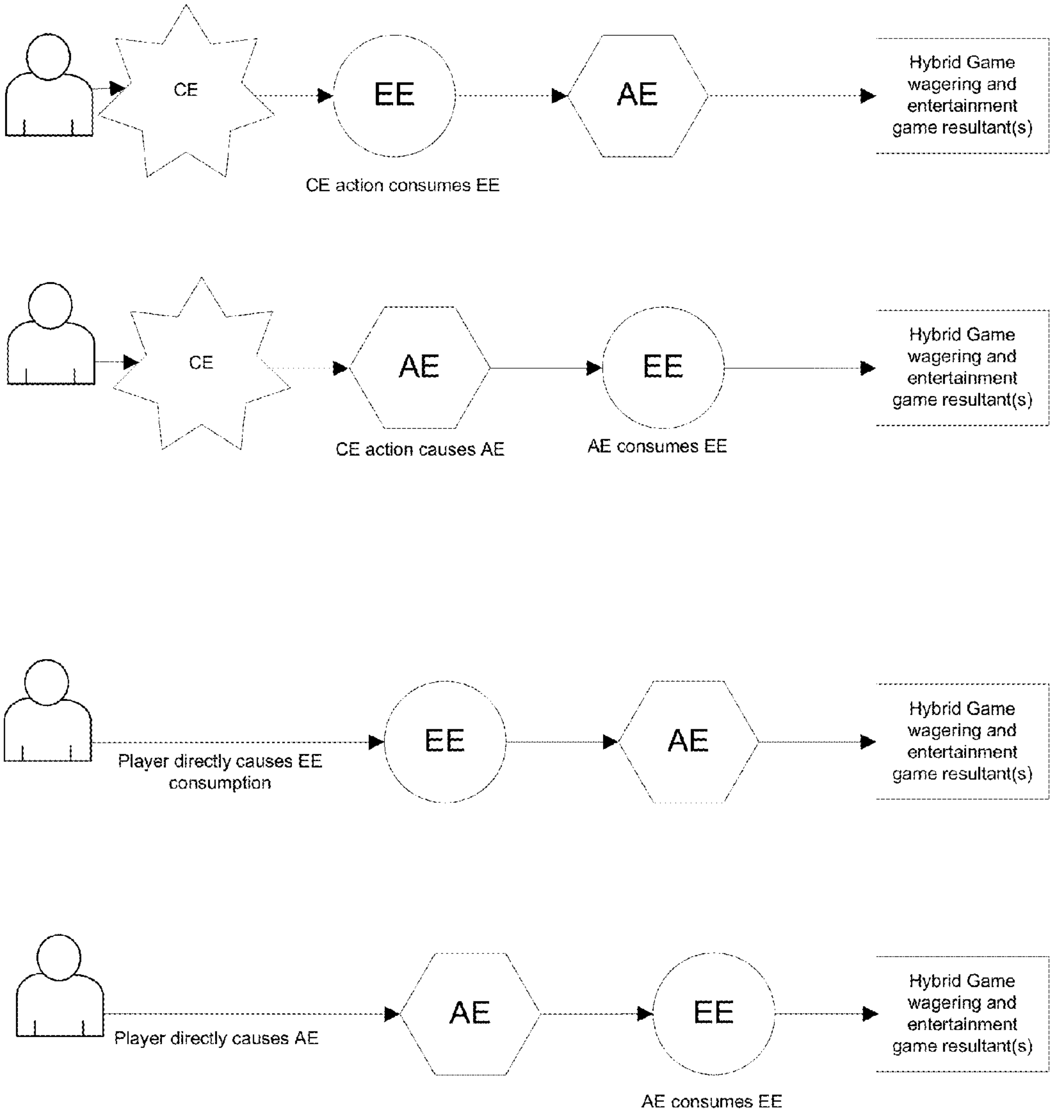
FIG. 16 is a flow chart illustrating additional initiation modes in accordance with embodiments of the invention.

FIG. 16 is a flow chart illustrating additional initiation modes in accordance with embodiments of the invention. The four flows shown in FIG. 16 introduce a further level of complexity, whereby there is a chain of more than one EE consumption or AE occurrence between the player or CE and the downstream events within the hybrid game (i.e. wagering, entertainment game processes, etc.). While the four cases illustrated show a two-step chain (AE-EE, EE-AE) various embodiments subsume the case of chains of other lengths, i.e. three, four, five, etc. For example (AE-AE-AE-EE, EE-EE-AE) and so on.

In some embodiments, a player 1600 instructs a controlled entity 1602 to take an action within the entertainment game. In response the, controlled entity consumes an EE 1604. In consuming the EE, an AE 1606 is interacted with within the entertainment game. The in doing so, any of the interactions as described herein may be initiated and performed within a hybrid game as indicated by box 1608.

In many embodiments, a player 1610 instructs a controlled entity 1612 to take an action within the entertainment game. In response the, controlled entity interacts with an AE 1614. In doing so, an EE 1616 is consumed in a process such as any of the hybrid game processes as described herein as indicated by box 1618.

In numerous embodiments, a player 1620 directly consumes an EE 1622 which in turn causes an interaction with an AE 1624. In doing so, any of the interactions as described herein may be initiated and performed within a hybrid game as indicated by box 1626.

In some embodiments, a player 1628 directly interacts with an AE 1630 which in turn causes consumption of an EE 1632. In doing so, any of the processes as described herein may be initiated and performed within a hybrid game as indicated by box 1634.

In the aforementioned tank game embodiments, bets could be launched as a function of AE interaction and/or EE consumption, the events that take place within the entertainment game as a result of the player's decisions and/or the general's decisions (e.g. battle is won or lost, and the amount of damage inflicted and taken by the respective armies involved), the awarding of GWC, specific display output (e.g graphics, sound, vibration), etc.

Processing Apparatus

Figure 17:
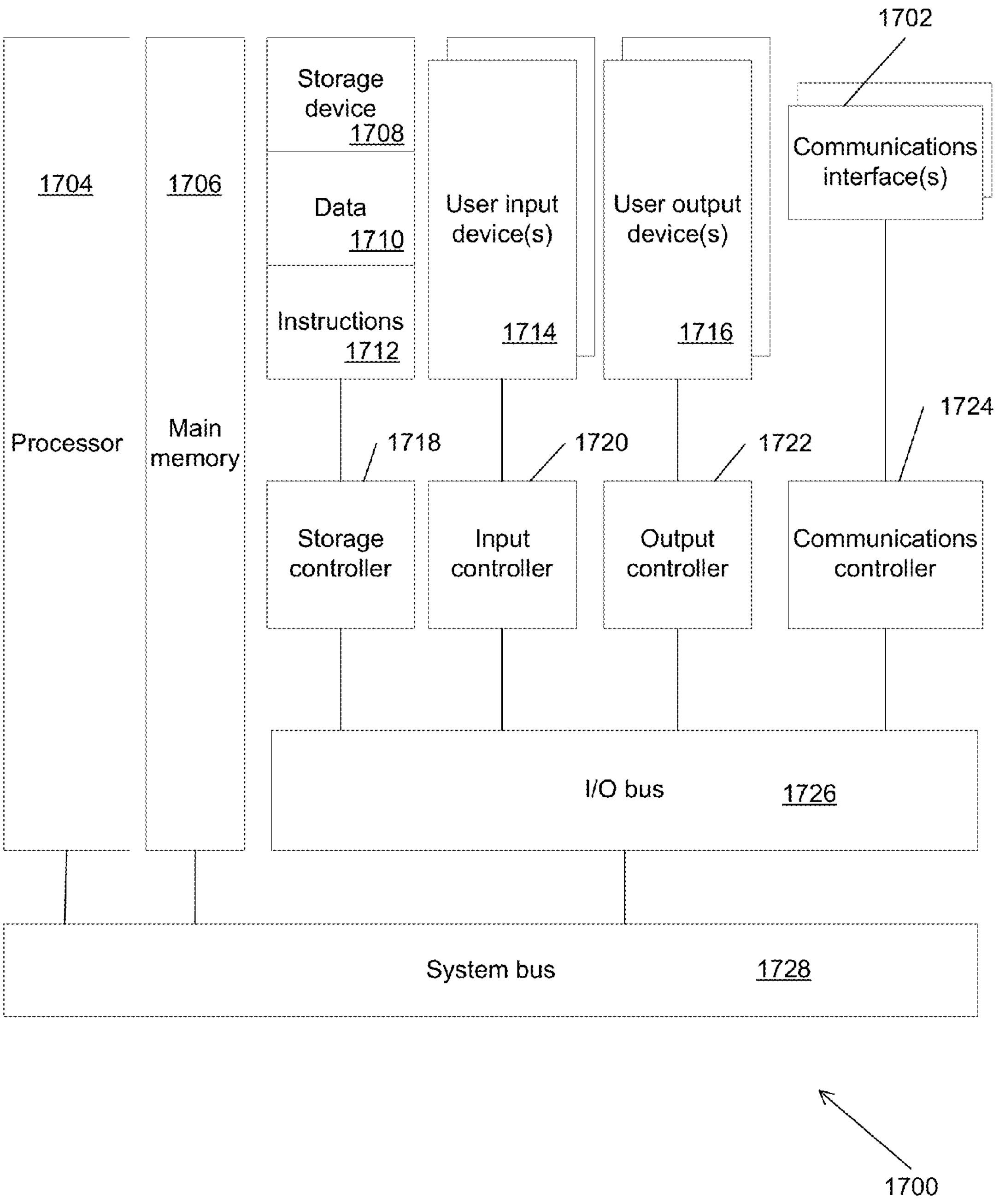
FIG. 17 illustrates a hardware architecture diagram of a processing apparatus utilized in the implementation of a controlled entity hybrid game in accordance with an embodiment of the invention.

Any of a variety of processing apparatuses can host various components of a controlled entity hybrid game in accordance with embodiments of the invention. In several embodiments, these processing apparatuses can include, but are not limited to, a mobile device, a gaming machine, a general purpose computer, a computing device and/or a controller. A processing apparatus that is constructed to implement a controlled entity hybrid game in accordance with an embodiment of the invention is illustrated in FIG. 17. In the processing apparatus 1700, a processor 1704 is coupled to a memory 1706 by a bus 1728. The processor 1704 is also coupled to non-transitory processor-readable storage media, such as a storage device 1708 that stores processor-executable instructions 1712 and data 1710 through the system bus 1728 to an I/O bus 1726 through a storage controller 1718. The processor 1704 is also coupled to one or more interfaces that may be used to connect the processor to other processing apparatuses as well as networks as described herein. The processor 1704 is also coupled via the bus to user input devices 1714, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 1704 is connected to these user input devices 1714 through the system bus 1728, to the I/O bus 1726 and through the input controller 1720. The processor 1704 is also coupled via the bus to user output devices 1716 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1728 to the I/O bus 1726 and through the output controller 1722. The processor 1704 can also be connected to a communications interface 1702 from the system bus 1728 to the I/O bus 1726 through a communications controller 1724.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or may be implemented on a single processing apparatus. In addition, while certain aspects and features of processes described herein have been attributed to an RWE, GWE, or ESE, these aspects and features may be implemented in a hybrid form where any of the features or aspects may be performed by any of a RWE, GWE, ESE within a controlled entity hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A controlled entity hybrid gaming system, comprising:

an entertainment software controller connected by a network to a game world controller, wherein the entertainment software controller is constructed to:

execute an entertainment game providing outcomes based upon a player's skillful execution of the entertainment game; and convey, to the game world controller by the network, actions taken by the player during the player's skillful execution of the entertainment game, wherein the actions taken by the player include the player's instruction of a controlled entity of the entertainment game whereby the controlled entity consumes a discrete amount of an enabling element of the entertainment game, wherein the enabling element is an element of the entertainment game utilized by the controlled entity in a game world environment, and wherein upon consumption of the enabling element, a wager of real world credits is triggered in a gambling game by the game world controller; and the game world controller connected to a real world controller and connected by the network to the entertainment software controller, wherein the game world controller is constructed to:

receive from the entertainment software controller the actions taken by the player;

trigger the wager of the amount of real world credits in the gambling game based upon the actions taken by the player, wherein the amount of real world credits is based on the discrete amount of the enabling element consumed by the controlled entity;

receive a gambling game outcome as a randomly generated payout of real world credits from the wager of the amount of real world credits in the gambling game from the real world controller;

accumulate an amount of the enabling element in a reserve enabling element reservoir as a result of a gambling game outcome; and allow access in the entertainment game to the amount of enabling element in the reserve enabling element reservoir on passing one or more transport tests on a basis of a value of an entertainment game variable of the entertainment game.

2. The controlled entity hybrid gaming system of claim 1, wherein consumption of the enabling element by the controlled entity causes an actionable element of the entertainment game to trigger the wager of the amount of real world credits in the gambling game.

3. The controlled entity hybrid gaming system of claim 1, wherein the entertainment game variable is a change in a game world credit caused by entertainment game play.

4. The controlled entity hybrid gaming system of claim 1, wherein the entertainment game variable is an entertainment game object required for consumption of the enabling element.

5. The controlled entity hybrid gaming system of claim 1, wherein the entertainment game variable is an entertainment game environmental condition required for consumption of the enabling element.

6. The controlled entity hybrid gaming system of claim 1, wherein the real world controller is connected by a network to the game world controller.

7. The controlled entity hybrid gaming system of claim 1, wherein the game world controller and the entertainment software controller are constructed from the same device.

8. The controlled entity hybrid gaming system of claim 1, wherein the real world controller and the game world controller are constructed from the same device.

9. A controlled entity hybrid gaming system, comprising:

a real world controller connected to a game world controller, wherein the real world controller is constructed to:

provide a gambling game outcome as a randomly generated payout of real world credits from a wager of an amount of real world credits in a gambling game; and receive a trigger from the game world controller to execute the wager of an amount of real world credits in the gambling game; and the game world controller connected to the real world controller and connected by a network to an entertainment software controller, wherein the game world controller is constructed to:

receive from the entertainment software controller the actions taken by the player during the player's skillful execution of an entertainment game executed by the entertainment software controller, wherein the actions taken by the player include the player's instruction of a controlled entity of the entertainment game whereby the controlled entity consumes a discrete amount of an enabling element of the entertainment game, and wherein the enabling element is an element of the entertainment game utilized by the controlled entity in a game world environment;

trigger the wager of the amount of real world credits in the gambling game based upon the actions taken by the player, wherein the amount of real world credits is based on the discrete amount of the enabling element consumed by the controlled entity;

accumulate an amount of the enabling element in a reserve enabling element reservoir as a result of the gambling game outcome; and allow access in the entertainment game to the amount of enabling element in the reserve enabling element reservoir on passing one or more transport tests on a basis of a value of an entertainment game variable of the entertainment game.

10. The controlled entity hybrid gaming system of claim 9, wherein consumption of the enabling element by the controlled entity causes an actionable element of the entertainment game to trigger the wager of the amount of real world credits in the gambling game.

11. The controlled entity hybrid gaming system of claim 9, wherein the entertainment game variable is a change in a game world credit caused by entertainment game play.

12. The controlled entity hybrid gaming system of claim 9, wherein the entertainment game variable is an entertainment game object required for consumption of the enabling element.

13. The controlled entity hybrid gaming system of claim 9, wherein the entertainment game variable is an entertainment game environmental condition required for consumption of the enabling element.

14. The controlled entity hybrid gaming system of claim 9, wherein the real world controller is connected by a network to the game world controller.

15. The controlled entity hybrid gaming system of claim 9, wherein the game world controller and the entertainment software controller are constructed from the same device.

16. The controlled entity hybrid gaming system of claim 9, wherein the real world controller and the game world controller are constructed from the same device.

* * * * *